US008734016B2

(12) United States Patent
Borchardt et al.

(10) Patent No.: US 8,734,016 B2
(45) Date of Patent: May 27, 2014

(54) INCREMENTALLY-STRETCHED THERMOPLASTIC FILMS WITH ENHANCED LOOK AND FEEL AND METHODS FOR MAKING THE SAME

(75) Inventors: Michael G. Borchardt, Naperville, IL (US); Robert T. Dorsey, Western Springs, IL (US)

(73) Assignee: The Glad Products Company, Oakland, CA (US)

( * ) Notice: Subject to any disclaimer, the term of this patent is extended or adjusted under 35 U.S.C. 154(b) by 168 days.

(21) Appl. No.: 13/433,133

(22) Filed: Mar. 28, 2012

(65) Prior Publication Data
US 2013/0259408 A1  Oct. 3, 2013

(51) Int. Cl.
*B65D 33/00* (2006.01)
*B65D 33/02* (2006.01)

(52) U.S. Cl.
USPC .......................................... 383/105; 383/119

(58) Field of Classification Search
USPC ............................... 383/105, 119, 32, 35, 120
See application file for complete search history.

(56) References Cited

U.S. PATENT DOCUMENTS

| | | |
|---|---|---|
| 2,714,571 A | 8/1955 | Irion et al. |
| 3,058,868 A | 10/1962 | Schroeder |
| 3,393,861 A * | 7/1968 | Clayton et al. .................. 383/35 |
| 3,622,422 A | 11/1971 | Newman |
| 3,857,144 A | 12/1974 | Bustin |
| 4,116,892 A | 9/1978 | Schwarz |
| 4,153,751 A | 5/1979 | Schwarz |
| 4,289,832 A | 9/1981 | Schwarz |
| 4,302,495 A | 11/1981 | Marra |
| 4,343,848 A | 8/1982 | Leonard, Jr. |
| 4,379,197 A | 4/1983 | Cipriani |
| 4,438,167 A | 3/1984 | Schwarz |
| 4,517,714 A | 5/1985 | Sneed et al. |
| 4,522,203 A | 6/1985 | Mays |
| 4,614,679 A | 9/1986 | Farrington, Jr. et al. |
| 4,692,368 A | 9/1987 | Taylor et al. |
| 4,704,238 A | 11/1987 | Okuyama et al. |
| 4,753,840 A | 6/1988 | Van Gompel |
| 4,930,905 A | 6/1990 | Sharps, Jr. |
| 5,035,941 A | 7/1991 | Blackburn |
| 5,100,721 A | 3/1992 | Akao |
| 5,296,184 A | 3/1994 | Wu et al. |
| 5,382,461 A | 1/1995 | Wu |
| 5,422,172 A | 6/1995 | Wu |
| 5,518,801 A | 5/1996 | Chappell et al. |
| 5,851,937 A | 12/1998 | Wu et al. |
| 5,861,074 A | 1/1999 | Wu |
| 5,865,926 A | 2/1999 | Wu et al. |
| 6,013,151 A | 1/2000 | Wu et al. |
| 6,139,185 A | 10/2000 | Hamilton et al. |
| 6,214,147 B1 | 4/2001 | Mortellite et al. |
| 6,265,045 B1 | 7/2001 | Mushaben |
| 6,254,736 B1 | 8/2001 | Chrismore et al. |
| 6,361,784 B1 | 3/2002 | Brennan et al. |
| 6,385,818 B1 | 5/2002 | Savicki, Sr. |

(Continued)

*Primary Examiner* — Jes F Pascua
(74) *Attorney, Agent, or Firm* — Thomas C. Feix

(57) ABSTRACT

Methods of increasing the perceived thickness and strength of a thermoplastic film include incrementally stretching thermoplastic films in the machine direction. In one or more implementations, methods of incrementally stretching thermoplastic films include reducing the gauge of the films while increasing a loft of at least a portion of the film. The methods can involve cold stretching the films and imparting rib patterns and alternating peaks and valleys into the film. The linear ribs can have alternating thick and thin gauges.

9 Claims, 14 Drawing Sheets

(56) References Cited

U.S. PATENT DOCUMENTS

| | | |
|---|---|---|
| 6,394,651 B2 | 5/2002 | Jackson |
| 6,394,652 B2 | 5/2002 | Meyer et al. |
| 6,594,872 B2 * | 7/2003 | Cisek .............................. 24/401 |
| 7,306,729 B2 | 12/2007 | Bacino et al. |
| 2002/0074691 A1 | 6/2002 | Mortellite et al. |
| 2006/0093766 A1 | 5/2006 | Savicki et al. |
| 2007/0166503 A1 | 7/2007 | Hannigan |
| 2008/0124461 A1 | 5/2008 | Leener et al. |
| 2009/0029114 A1 | 1/2009 | Cancio et al. |
| 2011/0044565 A1 * | 2/2011 | Pawloski et al. ................. 383/63 |
| 2011/0114249 A1 | 5/2011 | Rasmussen |
| 2012/0039550 A1 * | 2/2012 | MacPherson et al. ........ 383/109 |
| 2012/0134606 A1 * | 5/2012 | Borchardt et al. .......... 383/116 |
| 2012/0163738 A1 * | 6/2012 | Borchardt et al. ............ 383/107 |
| 2013/0028542 A1 * | 1/2013 | Borchardt .................... 383/119 |
| 2013/0029066 A1 * | 1/2013 | Borchardt .................... 428/35.5 |
| 2013/0115396 A1 * | 5/2013 | Borchardt .................... 428/35.5 |
| 2013/0140207 A1 * | 6/2013 | Wilcoxen et al. ............. 206/389 |
| 2013/0202229 A1 * | 8/2013 | Broering et al. ............... 383/75 |
| 2013/0202853 A1 * | 8/2013 | Bergman et al. ............. 428/167 |

* cited by examiner

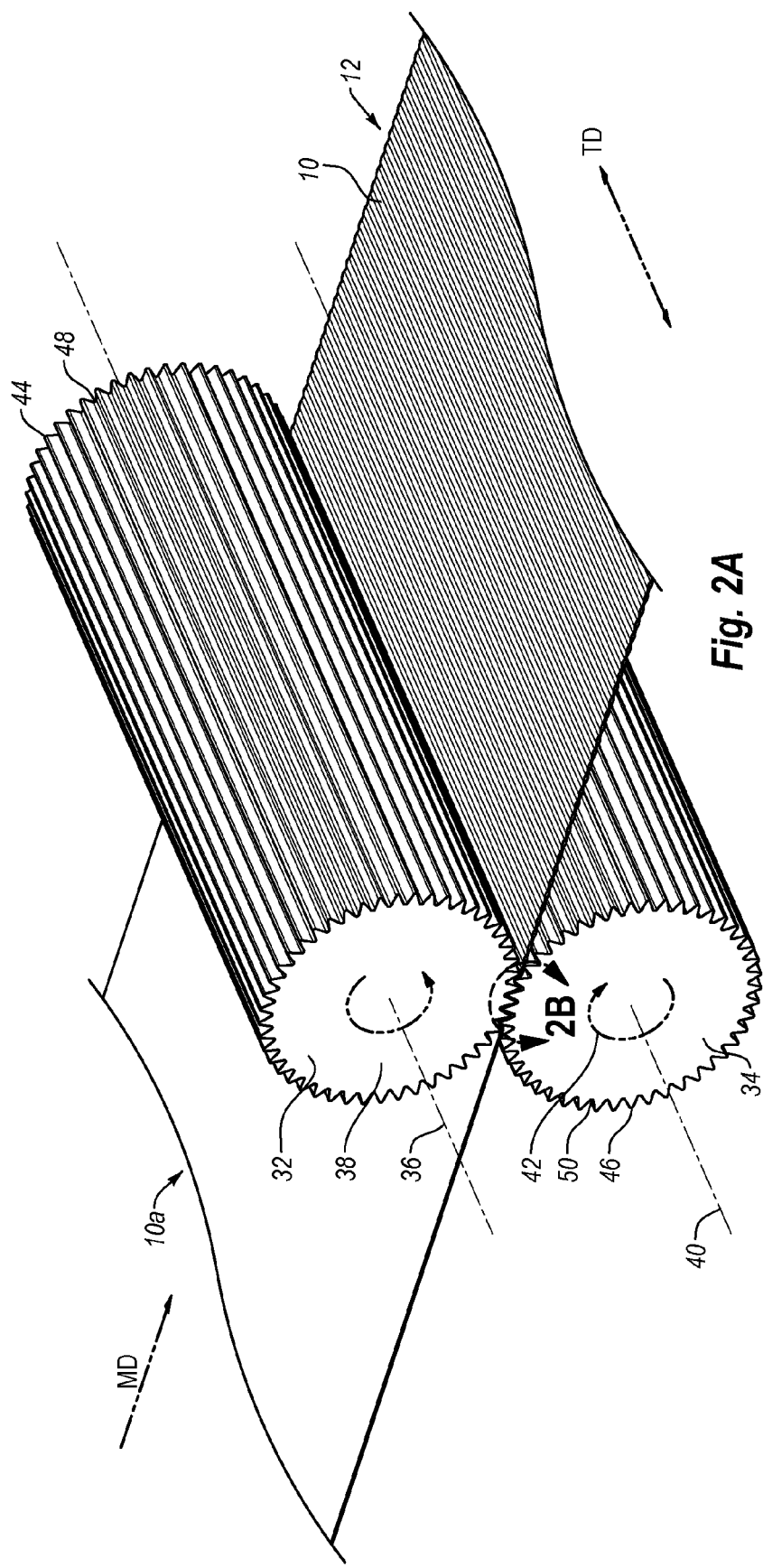

INCREMENTALLY-STRETCHED THERMOPLASTIC FILMS WITH ENHANCED LOOK AND FEEL AND METHODS FOR MAKING THE SAME

BACKGROUND OF THE INVENTION

1. The Field of the Invention

The present invention relates generally to thermoplastic films. Specifically, the invention relates to stretched thermoplastic films with increased loft.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many attempt to control manufacturing costs by decreasing the amount of thermoplastic material in a given product.

One way manufacturers may attempt to reduce production costs is to stretch the thermoplastic film, thereby increasing its surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

To MDO a film, manufacturers commonly heat the film to an elevated temperature and stretch the film in the machine direction. Commonly, manufacturers will stretch the thermoplastic film between approximately 300 to 500 percent of the film's original length or more.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. One type of incremental stretching is referred to as ring rolling.

Unfortunately, stretched or otherwise thinner thermoplastic films can have undesirable properties. For example, thinner thermoplastic films can are typically more transparent or translucent. Additionally, consumers commonly associate thinner films with weakness. Such consumers may feel that they are receiving less value for their money when purchasing products with thinner films; and thus, may be dissuaded to purchase thinner thermoplastic films. As such, manufacturers may be dissuaded to stretch a film or use thinner films despite the potential material savings.

Accordingly, there are a number of considerations to be made in thermoplastic films and manufacturing methods.

BRIEF SUMMARY OF THE INVENTION

Implementations of the present invention solve one or more problems in the art with apparatus and methods for creating films that appear thicker, and thus, stronger. In particular, one or more implementations of the present invention include incrementally-stretched films that include undulations and convolutions that extend out of plane of the initial flat film. The undulations and convolutions can provide the film with one or more of increased loft, a perception of thickness, and improved tactile feel. Additional implementations include bags including such films and methods of incrementally stretching films in the machine direction to create such films.

For example, one implementation of a machine-direction incrementally-stretched film with increased loft created by stretching an un-stretched thermoplastic film can include a thermoplastic material. The machine-direction incrementally-stretched film can also include a ribbed pattern including thick and thin linear ribs extending in the transverse direction across the machine-direction incrementally-stretched film. At least the thin linear ribs can include a plurality of undulations extending generally in the transverse direction.

Additionally, one or more implementations of the present invention include a thermoplastic bag that includes first and second opposing sidewalls. The first and second opposing sidewalls can be joined together along a first side edge, an opposite second side edge, and a bottom edge. The first and second sidewalls can be un-joined along at least a portion of their respective top edges to define an opening. The thermoplastic bag can further include a plurality of thick and thin linear ribs in at least one of the first and second sidewalls. The alternating thick and thin linear ribs can extend in the transverse direction. Also, the thermoplastic bag can include a plurality of peaks and valleys in the at least one of the first and second sidewalls. The plurality of peaks and valleys can extend generally in the transverse direction.

In addition to the forgoing, a method of creating a film with one or more of increased loft, a perception of thickness and/or strength, and improved tactile feel can involve providing a film of a thermoplastic material. The method can also involve cold stretching the film incrementally in the machine direction by passing the film between intermeshing machine-direction ring rollers. Passing the film through the intermeshing machine-direction ring rollers can create a ribbed pattern including alternating thick and thin linear ribs extending in the transverse direction across the film. Additionally, passing the film through the intermeshing machine-direction ring rollers can further create a plurality of peaks and valleys extending generally in the transverse direction.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 2A illustrates a schematic diagram of a thermoplastic film being incrementally stretched in the machine direction in accordance with one or more implementations of the present invention;

DETAILED DESCRIPTION OF THE PREFERRED EMBODIMENTS

Figure 1A:
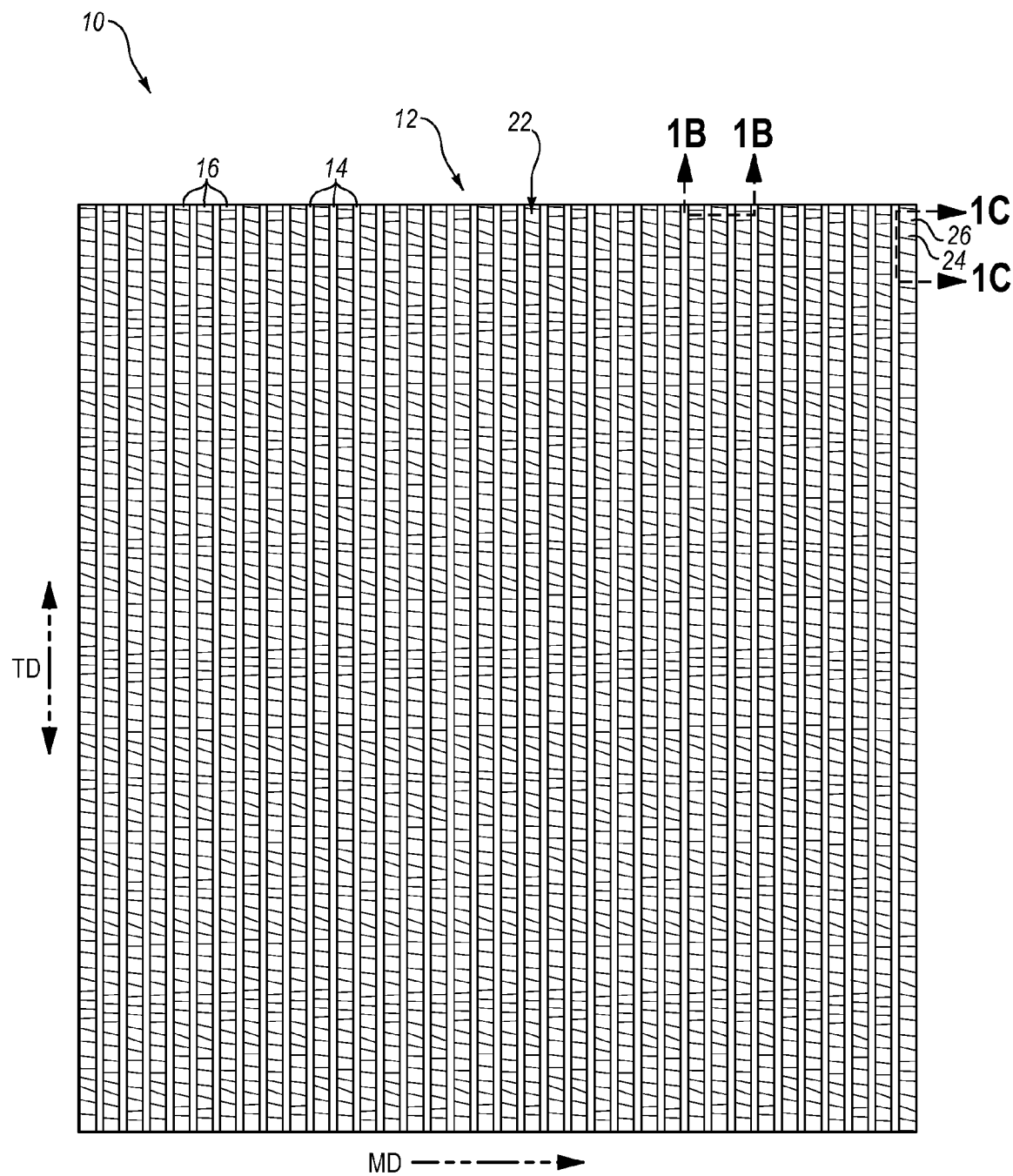
FIG. 1A illustrates a view of machine-direction incrementally-stretched film with enhanced look and feel in accordance with one or more implementations of the present invention.

One or more implementations of the present invention solve one or more problems in the art with apparatus and methods for creating films that appear thicker, and thus, stronger. In particular, one or more implementations of the present invention include incrementally-stretched films that include undulations and convolutions that extend out of plane of the initial flat film. The undulations and convolutions can provide the film with one or more of increased loft, a perception of thickness, and improved tactile feel. Additional implementations include bags including such films and methods of incrementally stretching films in the machine direction to create such films.

Indeed, one or more implementations of the present invention can provide thermoplastic films, and products made therefrom, with less raw material (i.e., a reduced gauge by weight) yet maintained or increased loft. Thus, one or more implementations can reduce the material needed to produce a product without compromising important material properties, such as loft. One will appreciate in light of the disclosure herein that such material reductions can provide significant cost savings.

Additionally, consumers may associate thinner films (e.g., films with decreased gauge by weight) with decreased strength. Indeed, consumers may feel that they are receiving less value for their money when purchasing thermoplastic film products with thinner gauges. One will appreciate in light of the disclosure herein that a consumer may not readily detect that one or more films of the present invention has a reduced gauge by weight.

MD ring rolling of thinner films in accordance with implementations of the present invention allows formation of lofted films that are easily detected and perceived as thicker, stronger films by consumers. The increased loft of the film is the result of undulations and convolutions of the film out of plane of the initial flat film. Unexpectedly, the undulations and convolutions do not follow the regular pattern of the teeth marks imparted to the stretched film. Indeed, one or more implementations include localized peaks, ridges, and valleys that run transverse to thicker and thinner ribs.

One or more implementations also include films with an improved tactile attributes, which reflect the interference of ridges or strain fronts on the ring rolled film with each other to create a locking effect. This tactile attribute can provide a consumer with a perception of strength. Additionally, the tactile attribute attributes of films of one or more implementations can exhibit a soft feel. Thus, by increasing the loft of thinner films, the consumer may perceive the lofted film as being thicker, having increased strength, additional processing, and enhanced softness.

As alluded to previously, one or more implementations include methods of incrementally stretching a film with the unexpected result of increasing the loft of the film. In particular, as will be described in greater detail below, one or more implementations provide synergistic effects when incrementally cold-stretching thermoplastic films in the machine direction and/or transverse direction. Indeed, the films of the present invention can undergo one or more film stretching processes under ambient or cold (non-heated) conditions. This differs significantly from most conventional processes that stretch films under heated conditions.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

In at least one implementation of the present invention, the film can include linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some implementations of the present invention can use an octene comonomer, solution phase LLDPE (MI=1.1; $\rho$=0.920). Additionally, other implementations of the present invention can use a gas phase LLDPE, which is a hexene gas phase LLDPE formulated with slip/AB (MI=1.0; $\rho$=0.920). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

Indeed, implementations of the present invention can include any flexible or pliable thermoplastic material which may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, films of one or more implementations of the present invention can also include one or more additives. For examples, the films can include pigments, slip agents, anti-block agents, or tackifiers. The pigments can include $TiO_2$, or other pigments, that can impart a color and/or opacity to the film.

One will appreciate in light of the disclosure herein that manufacturers may form the individual films or webs so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, bilayer, or multilayered films.

Alternative to conventional flat extrusion or cast extrusion processes, a manufacturer can form the films using other suitable processes, such as, a blown film process to produce monolayer, bilayer, or multilayered films. If desired for a given end use, the manufacturer can orient the films by trapped bubble, tenterframe, or other suitable processes. Additionally, the manufacturer can optionally anneal the films.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a multi-layered film with layers having different compositions. In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

As used herein, the term "starting gauge" or "initial gauge" refers to the average distance between the major surfaces of a film before it is incrementally stretched. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

Figure 1B:
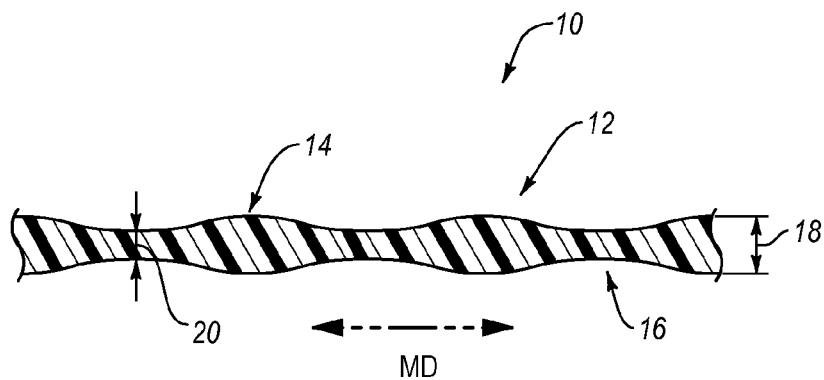
FIG. 1B illustrates a cross-sectional view of machine-direction incrementally-stretched film with enhanced look and feel of FIG. 1A taken along the line 1B-1B of FIG. 1A.
Figure 1C:
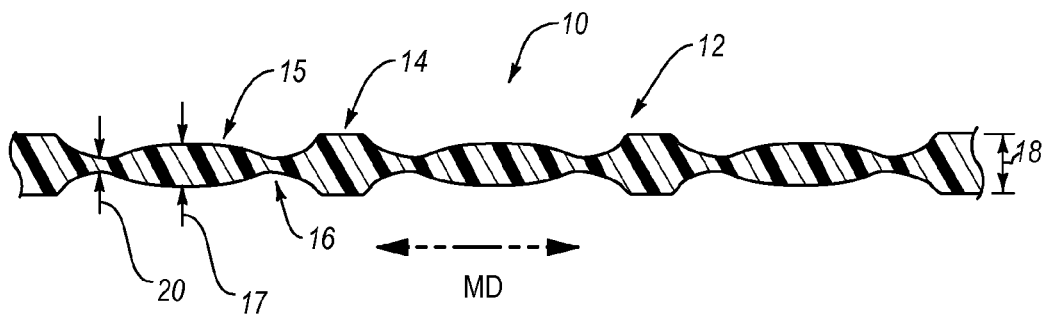
FIG. 1C illustrates a cross-sectional view of another machine-direction incrementally-stretched film with enhanced look and feel similar to that shown in FIG. 1B.
Figure 1D:
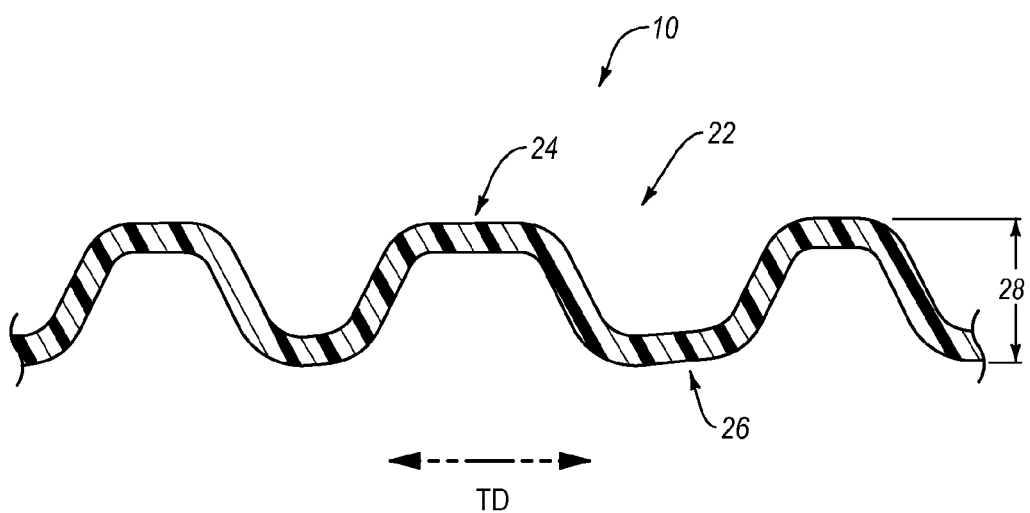
FIG. 1D illustrates a cross-sectional view of machine-direction incrementally-stretched film with enhanced look and feel of FIG. 1A taken along the line 1C-1C of FIG. 1A.

Referring now to Figures, FIGS. 1A-1D illustrate various view of one exemplary MD incrementally-stretched film 10. Specifically, FIG. 1A illustrates a top view of the MD incrementally-stretched film 10, while FIGS. 1B and 1D illustrate cross-sectional views of the MD incrementally-stretched film 10. As shown by FIGS. 1A and 1B, the MD incrementally-stretched film 10 can include a ribbed pattern 12.

The ribbed pattern 12 can include alternating series of thicker sections or ribs 14 and thinner sections or ribs 16. The thicker ribs 14 can comprise "un-stretched" regions and the thinner ribs 16 can comprise stretched regions. In one or more implementations, the thicker ribs 14 regions of the incrementally-stretched films may be stretched to a small degree. In any event, the thicker ribs 14 are stretched less compared to the thinner ribs 16. The ribs 14, 16 can extend across the MD incrementally-stretched film 10 in the transverse direction.

As shown by FIG. 1B, the thicker ribs 14 can have a first average thickness or gauge 18. The first average gauge 18 can be approximately equal to the starting gauge of the film used to create the MD incrementally-stretched film 10. In one or more implementations, the first average gauge 18 can be less than the starting gauge. The thinner ribs 16 can have a second average thickness or gauge 20. The second average gauge 20 can be less than both the starting gauge and the first average gauge 18. For example, in at least one implementations the thin linear ribs 16 can have a thickness 20 approximately ⅓ that of the thickness 18 of the thick linear ribs 14.

FIGS. 1A and 1B further illustrates that the thinner ribs 16 can be intermittently dispersed about thicker ribs 14. In particular, each thinner rib 16 can reside between adjacent thicker ribs 14. In other words, the thick and thinner ribs 14, 16 can alternate across the film in the machine direction. Additionally, in one or more implementations the thicker ribs 14 can be visually distinct from the thinner ribs 16. For example, depending upon the degree of stretch, the thicker ribs 14 can be more opaque than the thinner ribs 16. In other words, the thinner ribs 16 can be more transparent than the thicker ribs 14 in one or more implementations.

FIG. 1C illustrates another implementation of a cross section of a MD incrementally-stretched film 10 in accordance with the present invention. As shown by FIG. 1C, in some implementations the ribbed pattern 12 can include intermediately thick linear ribs 15. The intermediately thick linear ribs 15 can have a thickness 17 that is smaller than the thickness 18 of the thick linear ribs 14, but larger than the thickness 20 of the thin linear ribs 16. Thus, in one or more implementations adjacent thick linear ribs 14 are separated by a pair of thin linear ribs 16 and an intermediately thick linear rib 15 positioned between the pair of thin linear ribs 16.

The degree of strain (or depth of engagement to pitch ratio as explained in greater detail below) applied when forming the MD incrementally-stretched film 10 can dictate the configuration of the ribbed pattern 12. For example, greater degrees of strain can produce intermediately thick linear ribs 15 in addition to the thick and thin linear ribs 14, 16, as shown in FIG. 1C. While smaller degrees of strain can produce alternating thick and thin linear ribs 14, 16 as shown in FIG. 1B. Additionally, in one or more implementations the pair of thin linear ribs 16 and intermediately thick linear rib 15 positioned between adjacent thick linear ribs 14 may visually appear to be a single thin linear rib when viewed without magnification.

The remaining films and thermoplastic bags shown and described herein below illustrate alternating thick and thin linear ribs 14, 16 as shown by FIG. 1B. One will appreciate that such films and bags can further optionally include intermediately thick linear ribs 15. For ease of depiction and description; however, the ribbed patterns herein below will be described as including alternating thick and thin linear ribs only.

In any event, the ribbed pattern 12 can provide a pleasing appearance and connote strength to a consumer. For example, the ribbed pattern 12 can signify that the MD incrementally-stretched film 10 has undergone a physical transformation to modify one or more characteristics of the film. For example, MD ring rolling the film 10 can increase or otherwise modify one or more of the tensile strength, tear resistance, impact resistance, or elasticity of the MD incrementally-stretched film 10 as explained in greater detail in U.S. patent application Ser. No. 13/189,772 filed Jul. 25, 2011 and Ser. No. 13/190,677 filed Jul. 26, 2011, each of which are incorporated herein by reference in their entirety. The ribbed pattern 12 can signify the physical transformation to a consumer.

As shown by FIGS. 1A and 1D, the MD incrementally-stretched film 10 can further include undulations or convolutions 22. The undulations or convolutions 22 can extend generally perpendicular to the thicker 14 and thinner ribs 16. Thus, as shown by FIG. 1A, the undulations and convolutions 22 can extend generally across the film in the transverse direction.

In at least one implementation the undulations and convolutions 22 can be formed only or substantially in the thinner ribs 16 as shown in FIG. 1A. In alternative implementations the undulations and convolutions 22 can be formed in both the thicker 14 and thinner ribs 16. In still further implementations the undulations and convolutions 22 can be formed only or substantially in the thicker ribs 14.

The undulations and convolutions 22 can include alternating series of peaks 24 and valleys 26. The peaks 24 and valleys 26 can extend across the MD incrementally-stretched film 10 in the transverse direction. As shown by FIG. 1D, the peaks 24 and valleys 26 can define a loft 28. As used herein, the term "loft" refers to the largest distance between the outer major surfaces of a film. Thus, as shown by FIG. 1D, the loft 28 is the distance between peaks 24 and valleys 26.

In one or more implementations the loft 28 of the peaks 24 and valleys 26 is greater than the starting gauge of the film used to create the MD incrementally-stretched film 10. For example, in one or more implementations the loft 28 is between about 1.1 and about 50 times the starting gauge of the film used to create the MD incrementally-stretched film 10. More specifically, in one or more implementations the loft 28 is about 1.5, 2, 3, 4, 5, 6, 7, 8, 9, 10, 20, 25, 30, 35, 40, 45, or 50 times the starting gauge of the film used to create the MD incrementally-stretched film 10.

Thus, one will appreciate that that the peaks 24 and valleys 26 can provide a look and feel of increased thickness to a film. Furthermore, the peaks 24 and valleys 26 can provide a look and feel of increased thickness to a film despite reduced gauge-by-weight created by stretching the film. One will appreciate that the increased loft and perceived thickness provided by the peaks 24 and valleys 26 is thus unexpected as stretching a film typically reduces the loft and perceived thickness.

In addition to increased loft and perceived thickness, the peaks 24 and valleys 26 can provide a desirable aesthetic to the MD incrementally-stretched film 10. Furthermore, the peaks 24 and valleys 26 can impart a softer feel to the MD incrementally-stretched film 10. In particular, a manufacturer can impart a rougher feel to the MD incrementally-stretched film 10 by increasing the frequency of the loft and/or reducing the loft 28 of the peaks 24 and valleys 26. Alternatively, a manufacturer can impart a softer feel to the MD incrementally-stretched film 10 by decreasing the frequency and/or increasing the size of the peaks 24 and valleys 26.

Figure 2B:
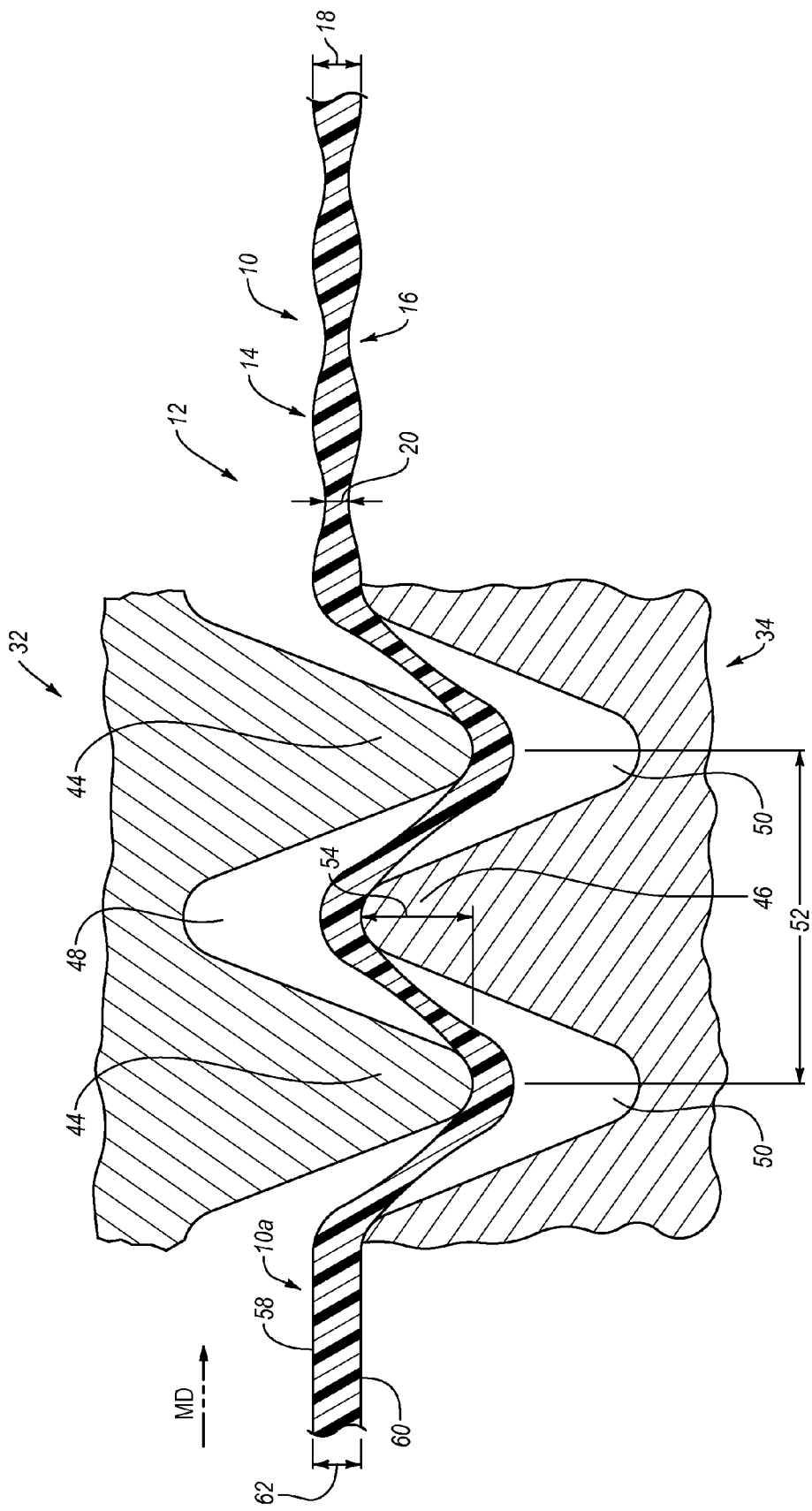
FIG. 2B illustrates an enlarged view of a portion of the thermoplastic film passing through the MD intermeshing rollers of FIG. 2A taken along the circle 2B of FIG. 2A.

FIGS. 2A and 2B illustrate one exemplary process of incrementally stretching a thermoplastic film in the machine direction in accordance with an implementation of the present invention. In particular, FIGS. 2A and 2B illustrate an MD ring rolling process that incrementally stretches a thermoplastic film 10a by passing the film 10a through a pair of MD intermeshing ring rollers 32, 34. As explained in greater detail below, the MD ring rolling processes of the present invention can stretch the film 10a in the machine direction, while also maintaining or increasing the loft or other properties of the film 10a.

As shown by the FIGS. 2A and 2B, the first roller 32 and the second roller 34 can each have a generally cylindrical shape. The MD intermeshing rollers 32, 34 may be made of cast and/or machined metal, such as, steel, aluminum, or any other suitable material. The MD intermeshing rollers 32, 34 can rotate in opposite direction about parallel axes of rotation. For example, FIG. 2A illustrates that the first roller 32 can rotate about a first axis 36 of rotation in a counterclockwise direction 38. FIG. 2A also illustrates that the second roller 34 can rotate about a second axis 40 of rotation in a clockwise direction 42. The axes of rotation 36, 40 can be parallel to the transverse direction and perpendicular to the machine direction.

The MD intermeshing rollers 32, 34 can closely resemble fine pitch spur gears. In particular, the MD intermeshing rollers 32, 34 can include a plurality of protruding ridges 44, 46. The ridges 44, 46 can extend along the MD intermeshing rollers 32, 34 in a direction generally parallel to axes of rotation 36, 40. Furthermore, the ridges 44, 46 can extend generally radially outward from the axes of rotation 36, 40. The tips of ridges 44, 46 can have a variety of different shapes and configurations. For example, the tips of the ridges 44, 46 can have a rounded shape as shown in FIG. 2B.

The ridges 44 on the first roller 32 can be offset or staggered with respect to the ridges 46 on the second roller 34. Thus, the grooves 48 of the first roller 32 can receive the ridges 46 of the second roller 34, as the MD intermeshing rollers 32, 34 intermesh. Similarly, the grooves 50 of the second roller 34 can receive the ridges 44 of the first roller 32. In one or more implementations, the ridges 44, 46 will not contact each other or transmit rotational torque during an intermeshing stretching operation.

Additionally, the configuration of the ridges 44, 46 and grooves 48, 50 can dictate the amount of stretching caused by the MD intermeshing rollers 32, 34. Referring specifically to FIG. 2B, various features of the ridges 44, 46 and grooves 48, 50 are shown in greater detail. The pitch and depth of engagement of the ridges 44, 46 can determine, at least in part, the amount of incremental stretching created by the MD intermeshing rollers 32, 34. As shown by FIG. 2B, the pitch 52 is the distance between the tips of two adjacent ridges on the same roller. The "depth of engagement" (DOE) 54 is the amount of overlap between ridges 44, 46 of the different MD intermeshing rollers 32, 34 during intermeshing. The ratio of DOE 54 to pitch 52 can determine, at least in part, the amount of stretch imparted by a pair of MD intermeshing rollers 32, 34.

As shown by FIG. 2A, the direction of travel of the film 10a through the MD intermeshing rollers 32, 34 is parallel to the machine direction and perpendicular to the transverse direction. As the thermoplastic film 10a passes between the MD intermeshing rollers 32, 34, the ridges 44, 46 can incrementally stretch the film 10a in the machine direction. In some implementations, stretching the film 10a in the machine direction can reduce the gauge of the film and increase the length of the film 10a. In other implementations, the film 10a may rebound after being stretched such that the gauge of the film 10a is not decreased. Furthermore, in some implementations, stretching the film 10a in the machine direction can reduce the width of the film 10a. For example, as the film 10a is lengthened in the machine direction, the film's length can be reduced in the transverse direction.

In particular, as the film 10a proceeds between the MD intermeshing rollers 32, 34, the ridges 44 of the first roller 32 can push the film 10a into the grooves 50 of the second roller 34 and vice versa. The pulling of the film 10a by the ridges 44, 46 can stretch the film 10a. The MD intermeshing rollers 32, 34 may not stretch the film 10a evenly along its length. Specifically, the rollers 32, 34 can stretch the portions of the film 10a between the ridges 44, 46 more than the portions of the film 10a that contact the ridges 44, 46. Thus, the MD intermeshing rollers 32, 34 can impart or form a ribbed pattern 12 into the film 10a. Additionally, the MD intermeshing rollers 32, 34 can impart or form the undulations or convolutions 22 in the film 10a. As used herein, the terms "impart" and "form" refer to the creation of a desired structure or geometry in a film upon stretching the film that will at least partially retain the desired structure or geometry when the film is no longer subject to any strains or externally applied forces.

As shown in FIGS. 2A and 2B, the ribbed pattern 12 formed by the MD ring rolling process can be visually perceivable. As used herein, the term "visually perceivable" refers to features that are readily discernible to the normal naked eye. In particular, visually perceivable features can be readily discernible to the normal naked eye when a film 10a including the features is subjected to normal use.

In one or more implementations, prior to passing through the MD intermeshing rollers 32, 34, the film 10a may not include a visually perceivable ribbed pattern 12 or undulations or convolutions 22. For example, FIGS. 2A and 2B illustrate that the un-stretched film 10a (i.e., the film that is yet to pass through the intermeshing rollers 32, 34) can have a substantially flat top surface 58 and substantially flat bottom surface 60. The un-stretched film 10a can have an initial thickness or starting gauge 62 extending between its major surfaces (i.e., the top surface 58 and the bottom surface 60). In at least one implementation, the starting gauge 62 can be substantially uniform along the length of the un-stretched film 10a.

For purposes of the present invention, the un-stretched film 10a need not have an entirely flat top surface 58. Indeed, the top surface 58 can be rough or uneven. Similarly, bottom surface 60 of the un-stretched film 10a can also be rough or uneven. Further, the starting gauge 62 need not be consistent or uniform throughout the entirety of un-stretched film 10a. Thus, the starting gauge 62 can vary due to intentional product design, manufacturing defects, tolerances, or other processing inconsistencies.

One will appreciate in light of the disclosure herein that the striped pattern 12 may vary depending on the method used to incrementally stretch the film 10a. To the extent that MD ring rolling is used to incrementally stretch the film 10a, the striped pattern 12 on the film 10a can depend on the pitch 52 of the ridges 44, 46, the DOE 54, and other factors. In one or more implementations, the molecular structure of the thermoplastic material of the film 10a may be rearranged to provide this shape memory.

The pitch 52 and the DOE 54 of the ridges 44, 46 of the MD intermeshing rollers 32, 34 can determine the width and spacing of the ribs 14, 16 and the loft 28 of the peaks 24 and valleys 26. Thus, as explained in greater detail below, by varying the pitch 52 and/or DOE 54, the width and/or spacing of the ribs 14, 16, the loft 28 of the peaks 24 and valleys 26, the amount of stretching the film undergoes, and the effects of the stretching on the physical properties can be varied.

Figure 3:
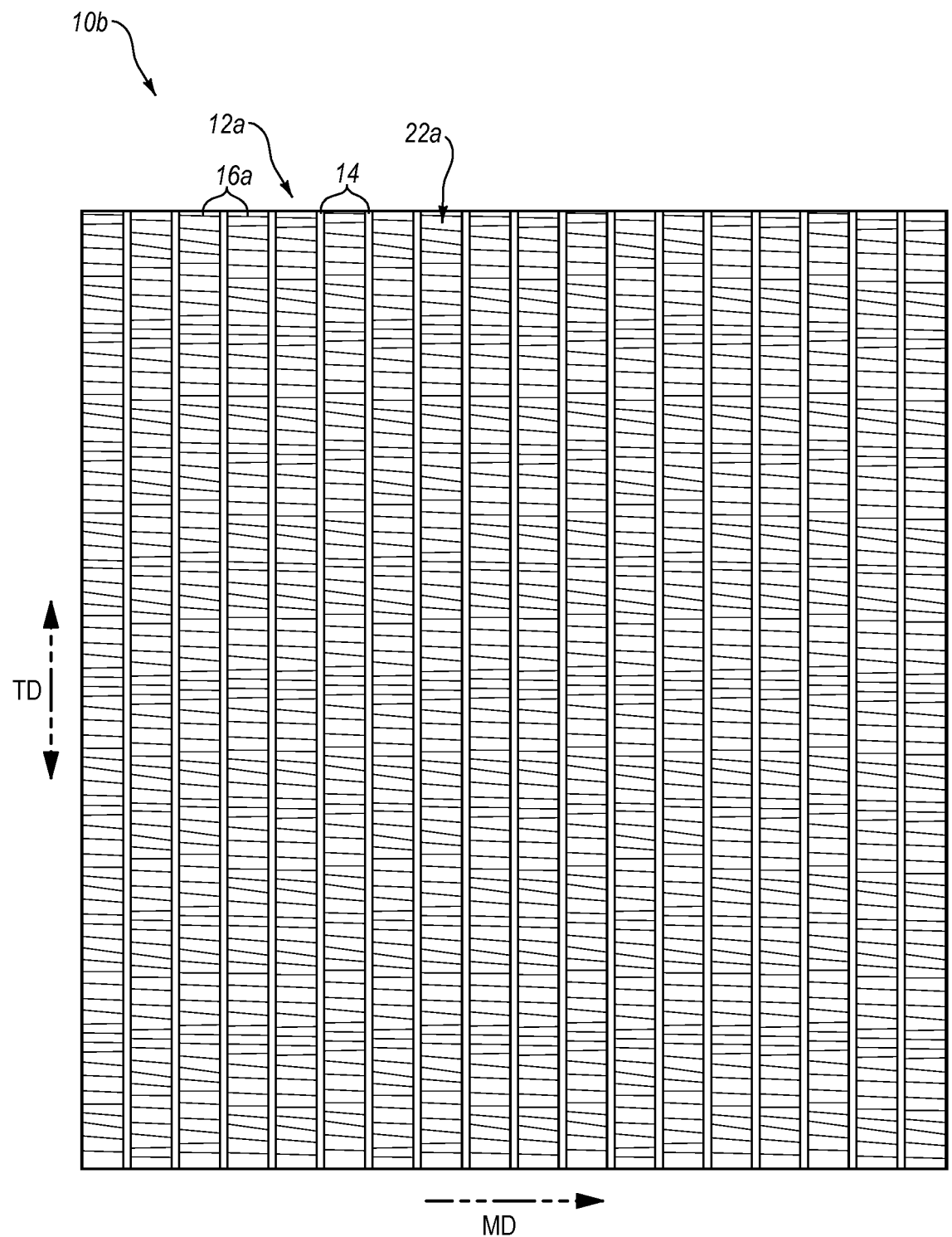
FIG. 3 illustrates a view of another machine-direction incrementally-stretched film with enhanced look and feel in accordance with one or more implementations of the present invention.

For example, FIG. 3 illustrates an MD incrementally-stretched film 10b formed using a pitch 52 several times larger than that used to create the MD incrementally-stretched film 10 illustrated in FIGS. 1A-1D. As shown by FIG. 3, the thinner ribs 16a and the undulations or convolutions 22a can be wider than those illustrated by FIG. 1A. One will appreciate that wider the thinner ribs 16a and the undulations or convolutions 22a can accentuate the visual effects of the MD incrementally-stretched film 10b. In other words, the peaks and valleys may be larger and more easily noticed. Similarly the increased width of the thinner ribs 16a can allow for an increased loft 28.

Figure 4:
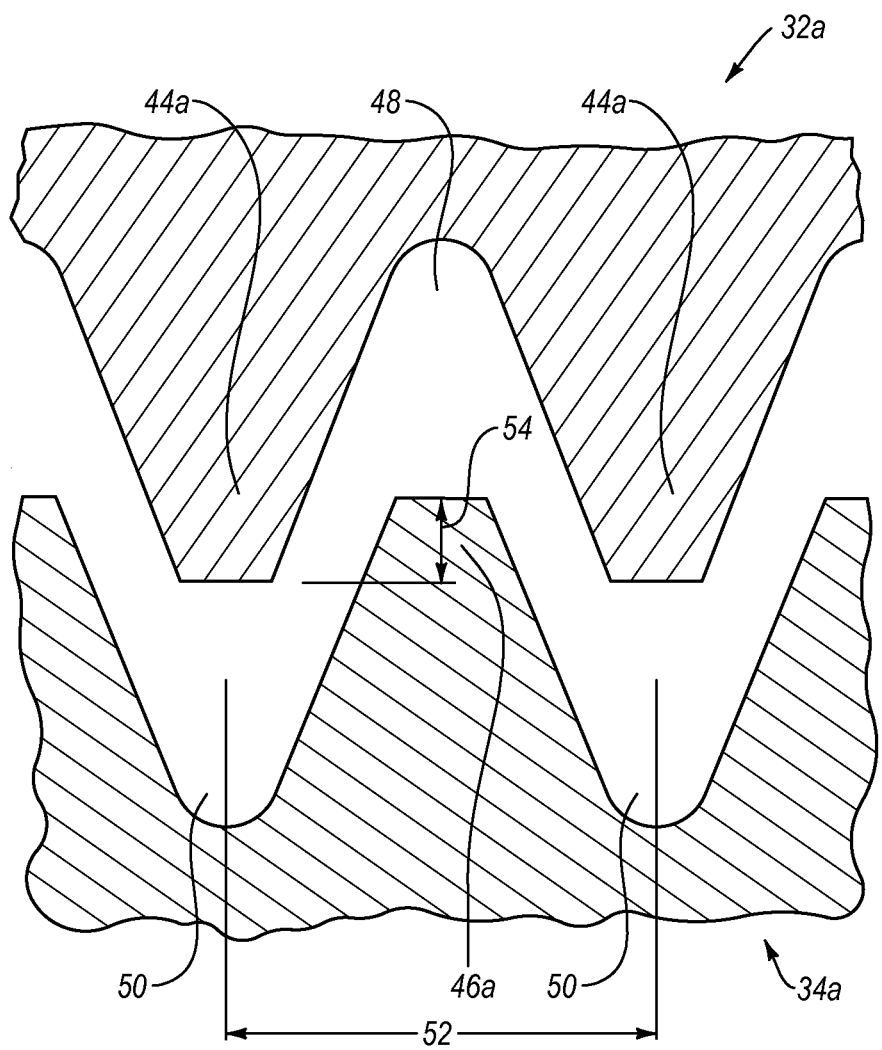
FIG. 4 illustrates a view of MD intermeshing rollers similar to those shown in FIG. 2B, albeit with flat ridges in accordance with one or more implementations of the present invention.

As alluded to earlier, the tips of ridges 44, 46 of the intermeshing rollers can have a variety of different shapes and configurations. For example, FIG. 4 illustrates another set of MD intermeshing rollers 32a, 34a similar to those shown in FIG. 2A, albeit that the tips of the ridges 44a, 46a can have sharp angled corners. The sharp angled corners of the ridges 44a, 46a can help to lock the film about the teeth or ridges 44a, 46a of the MD intermeshing rollers 32a, 34a. By locking the film about the teeth or ridges 44a, 46a, the sharp angled corners can produce enhanced, larger, or more easily noticeable ribbed pattern 12 and/or loft 28.

In addition to MD ring rolling, implementations of the present invention further include additionally, or alternatively, using TD ring rolling to incrementally stretch a thermoplastic film to enhance, or otherwise modify, physical properties of the film. For example, FIG. 5 illustrates a top view of a MD and TD incrementally-stretched film 10c.

The MD and TD incrementally-stretched film 10c can be formed by passing the MD incrementally-stretched film 10b shown in FIG. 3 through a pair of TD intermeshing rollers. A TD ring rolling processes (and associated TD intermeshing rollers) can be similar to the MD ring rolling process (and associated MD intermeshing rollers 32, 34) described herein above, albeit that the ridges and grooves 60, 62 of the TD intermeshing rollers can extend generally orthogonally to the axes of rotation.

Figure 5:
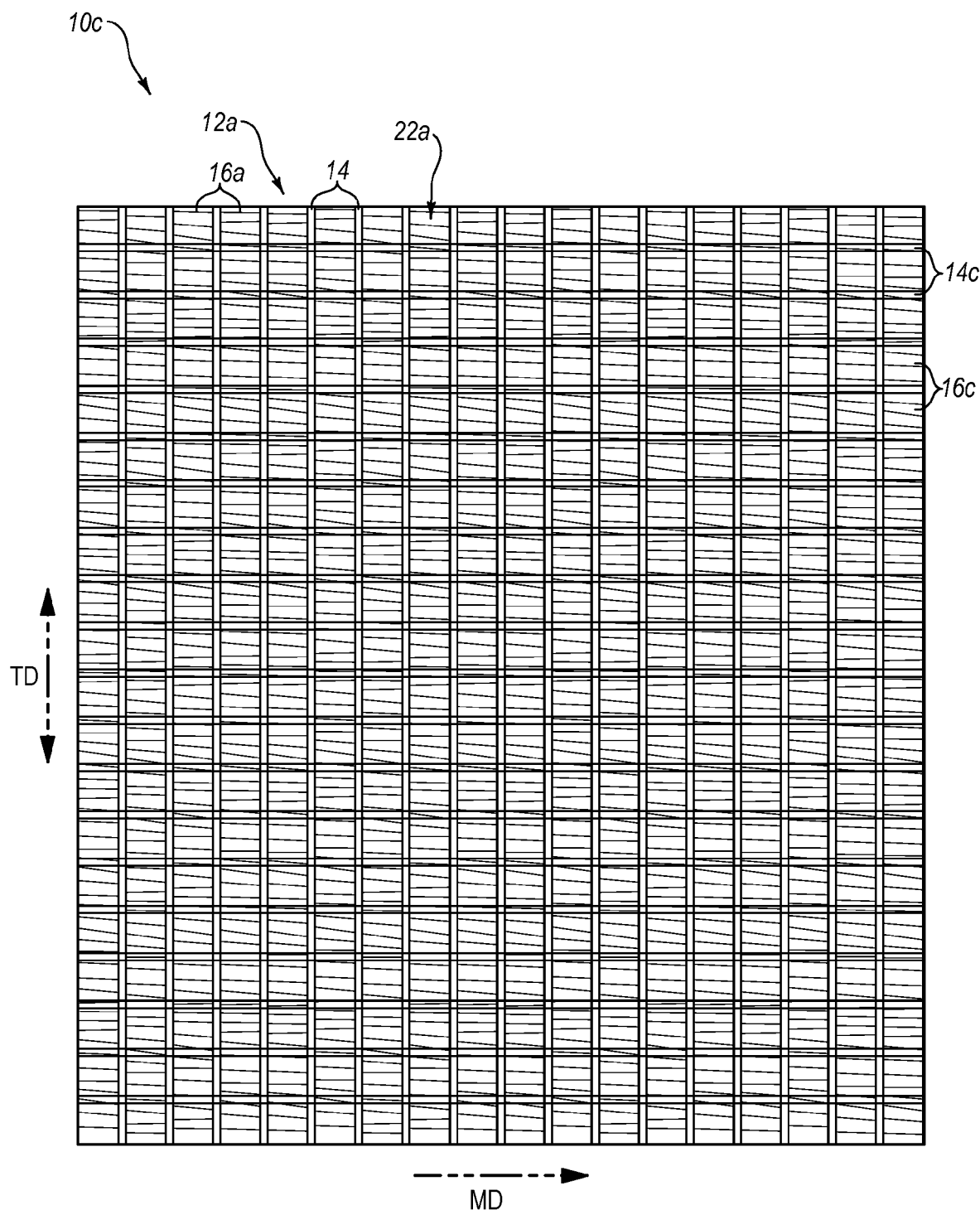
FIG. 5 illustrates a view of yet another machine-direction incrementally-stretched film with enhanced look and feel in accordance with one or more implementations of the present invention.

As shown by FIG. 5, the MD and TD incrementally-stretched film 10c can include thicker ribs 14, thinner ribs 16a, and undulations or convolutions 22a similar to those described hereinabove. Furthermore, the MD and TD incrementally-stretched film 10c can include thicker ribs 14c and thinner ribs 16c that extend across the film 10c in the direction in which the film was extruded (i.e., machine direction). As shown by FIG. 5, ribs 14c, 16c can extend across the entire length of the film 10c. The pitch and the DOE of the ridges of the TD intermeshing rollers can determine the width and spacing of the ribs 14c, 16c. Thus, by varying the pitch and/or DOE, the width and/or spacing of the ribs 14c, 16c, the amount of stretching the film undergoes, and the effects of the stretching on the physical properties can be varied.

As shown by FIG. 5, the MD and TD incrementally-stretched film 10c can include alternating series of thicker sections or ribs 14c and thinner sections or ribs 16c. The thicker ribs 14c can comprise "lesser-stretched" regions and the thinner ribs 16c can comprise stretched regions. In one or more implementations, the thicker ribs 14c regions of the incrementally-stretched films may be stretched to a small degree. In any event, the thicker ribs 14c are stretched less compared to the thinner ribs 16c.

The thicker ribs 14c can have a first average thickness or gauge. The first average gauge can be approximately equal to a starting gauge of the film 10. In one or more implementations, the first average gauge can be less than the starting gauge. The thinner ribs 16c can have a second average thickness or gauge. The second average gauge can be less than both the starting gauge and the first average gauge.

FIG. 5 further illustrates that the thinner ribs 16c can be intermittently dispersed about thicker ribs 14c. In particular, each thinner rib 16c can reside between adjacent thicker ribs 14c. Additionally, in one or more implementations, the thicker ribs 14c can be visually distinct from the thinner ribs 16c. For example, depending upon the degree of stretch, the thicker ribs 14c can be more opaque than the thinner ribs 16c. In other words, the thinner ribs 16c can be more transparent or translucent than the thicker ribs 14c in one or more implementations.

The ribs 14c, 16c can provide a pleasing appearance and connote strength to a consumer. For example, the ribs 14c, 16c can signify that the film 10c has undergone a transformation to modify one or more characteristics of the film 10c. For example, TD ring rolling the film 10 can increase or otherwise modify one or more of the tensile strength, tear resistance, impact resistance, or elasticity of the film 10. The ribs 14c, 16c can signify the transformation to a consumer.

In addition to the forgoing, TD ring rolling a MD incrementally-stretched film 10 can cause the size of the undulations or convolutions 22 (e.g., the peaks 24 and valleys 26) and/or the loft 28 to increase. In particular, in one or more implementations TD ring rolling the MD incrementally-stretched film can cause the undulations or convolutions 22 to have a raised arch configuration. In other words, TD ring rolling the MD incrementally-stretched film can cause the undulations or convolutions 22 to "pop" or otherwise have a more noticeable configuration.

The incrementally-stretched film 10c created by MD and TD ring rolling can allow for even greater material savings by further increasing the surface area of a given portion of film. Additionally, MD and TD ring rolling can provide properties or advantages not obtained by MD or TD ring rolling alone. Thus, checker board pattern created by the ribs can signify these transformations to a consumer.

In yet further implementations, a manufacturer can use diagonal direction ("DD") ring rolling to incrementally stretch a thermoplastic film to create increased loft and tactually-distinct stretched regions. A DD ring rolling processes (and associated DD intermeshing rollers) can be similar to the MD ring rolling process (and associated MD intermeshing rollers 32, 34) described herein above, albeit that the ridges and grooves of the DD intermeshing rollers can extend at an angle relative to the axes of rotation. The stretched regions can include ribs oriented at an angle relative to the transverse direction such that the ribs are neither parallel to the transverse or machine direction. In further implementations, the orientation of the ribs can be random. One will appreciate in light of the disclosure herein that one or more implementations can include stretched regions arranged in other patterns/shapes. Such additional patterns include, but are not limited to, intermeshing circles, squares, diamonds, hexagons, or other polygons and shapes. Additionally, one or more implementations can include stretched regions arranged in patterns that are combinations of the illustrated and described patterns/shapes.

The following examples present the results of a series of tests performed on thermoplastic films that have been incrementally stretched in the machine direction. These examples are illustrative of the invention claimed herein and should not be construed to limit in any way the scope of the invention.

Example 1

In a first example, mono-layer films were MD incrementally stretched using a cold MD ring rolling process similar to that described herein above. The three films were hexene gas phase LLDPE films having a starting gauge of 0.6 mils. The intermeshing rolls used in comparative Example 1 had a 0.100" pitch. The MD incrementally-stretched films were each assigned a tactile rating and a loft rating. Each of the tactile and loft rating were based on a 0-10 scale. Where a zero rating is a flat un-stretched film. A 10 tactile rating was given to the film that felt the softest and thickest. A 10 loft rating was given to the film that visually appeared to have the greatest loft. The MD DOE to pitch ratio used to stretch the films varied from between 0 and 1.0. The thermoplastic film was MD incrementally stretched with four different DOEs. Specifically, the film was MD incrementally stretched at MD DOEs of 0.25, 0.50, 0.75, and 1.

TABLE I

Physical Properties

| MD DOE/Pitch | Tactile Rating | Loft Rating | Gauge by Weight relative to un-stretched film (%) |
|---|---|---|---|
| 0 | 0 | 0 | 100 |
| 0.25 | 1 | 1 | 93 |
| 0.50 | 2 | 2 | 94 |
| 0.75 | 3 | 8 | 85 |
| 1 | 4 | 9 | 75 |

Table I lists some physical properties of these films along with the physical properties of the un-stretched film. The results from Table I indicate that the MD incrementally-stretched films can have a maintained or increased loft and tactile feel. The loft and tactile feel of the MD incrementally-stretched films can make the films appear thicker and stronger. The MD incrementally-stretched films of this example each included maintained or increased loft and tactile feel despite a reduction in gauge by weight. One will appreciate that this is unexpected, as stretched films typically have a reduced loft and appear thinner and weaker. As shown in Table I, one film was MD ring rolled with a DOE to pitch ratio of 0.0 and was scored a loft rating of 2.0. On increasing the MD DOE to pitch ratio to 1.0, the loft rating increased to 9.0 with a simultaneous gauge reduction of 25%.

Example 2

In a second example, the thermoplastic films of Example 1 were additionally TD incrementally stretched using a cold TD ring rolling process similar to that described herein above. The TD intermeshing rolls used in comparative Example 2 had a 5.933" diameter, 0.40" pitch, 30 diametral pitch, and a 14½° pressure angle. The DOE to pitch ratio used to stretch the films was 0.50.

TABLE II

Physical Properties

| MD DOE/Pitch | TD DOE/Pitch | Tactile Rating | Loft Rating | Gauge by Weight relative to un-stretched film (%) |
|---|---|---|---|---|
| 0 | 0 | 0 | 0 | 100 |
| 0 | 0.50 | 6 | 6 | 82 |
| 0.25 | 0.50 | 8 | 4 | 83 |
| 0.50 | 0.50 | 9 | 5 | 83 |
| 0.75 | 0.50 | 7 | 8 | 71 |
| 1 | 0.50 | 5 | 7 | 67 |

Table II lists some physical properties of these films along with the physical properties of the un-stretched film. The results from Table II indicate that the MD and TD incrementally-stretched films can have a maintained or increased loft and tactile feel. The loft and tactile feel of the MD and TD incrementally-stretched films can make the films appear thicker and stronger. The MD and TD incrementally-stretched films of this example each included maintained or increased loft and tactile feel despite a reduction in gauge by weight. One will appreciate that this is unexpected, as stretched films typically have a reduced loft and appear thinner and weaker. As shown in Table II, one film was MD ring rolled with a DOE to pitch ratio of 1.0, followed by TD ring rolling with a DOE to pitch ratio 0.50. This film had a loft rating of 7.0 with a gauge reduction of 33%. In another instance, one film was MD ring rolled with a DOE to pitch ratio of 0.50, followed by TD ring rolling with a DOE to pitch ratio of 0.50. This film had a tactile rating of 9.0 with a gauge reduction of 17%.

As shown by the various examples hereinabove, cold ring rolling can improve the look and feel of a film in one or more implementations. Additionally, in one or more implementations cold ring rolling can produce a reduction in film gauge, along with the unexpected result of improving the look and feel of a film. Furthermore, MD and TD cold ring rolling together can produce further gauge reductions.

One will appreciate in light of the disclosure herein that the MD and/or TD incrementally-stretched films with increased loft and/or improved look and feel can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include MD and/or TD incrementally-stretched with maintained or increased physical properties to one extent or another. Trash bags and food storage bags, in particular, may benefit by the films of the present invention.

Figure 6:
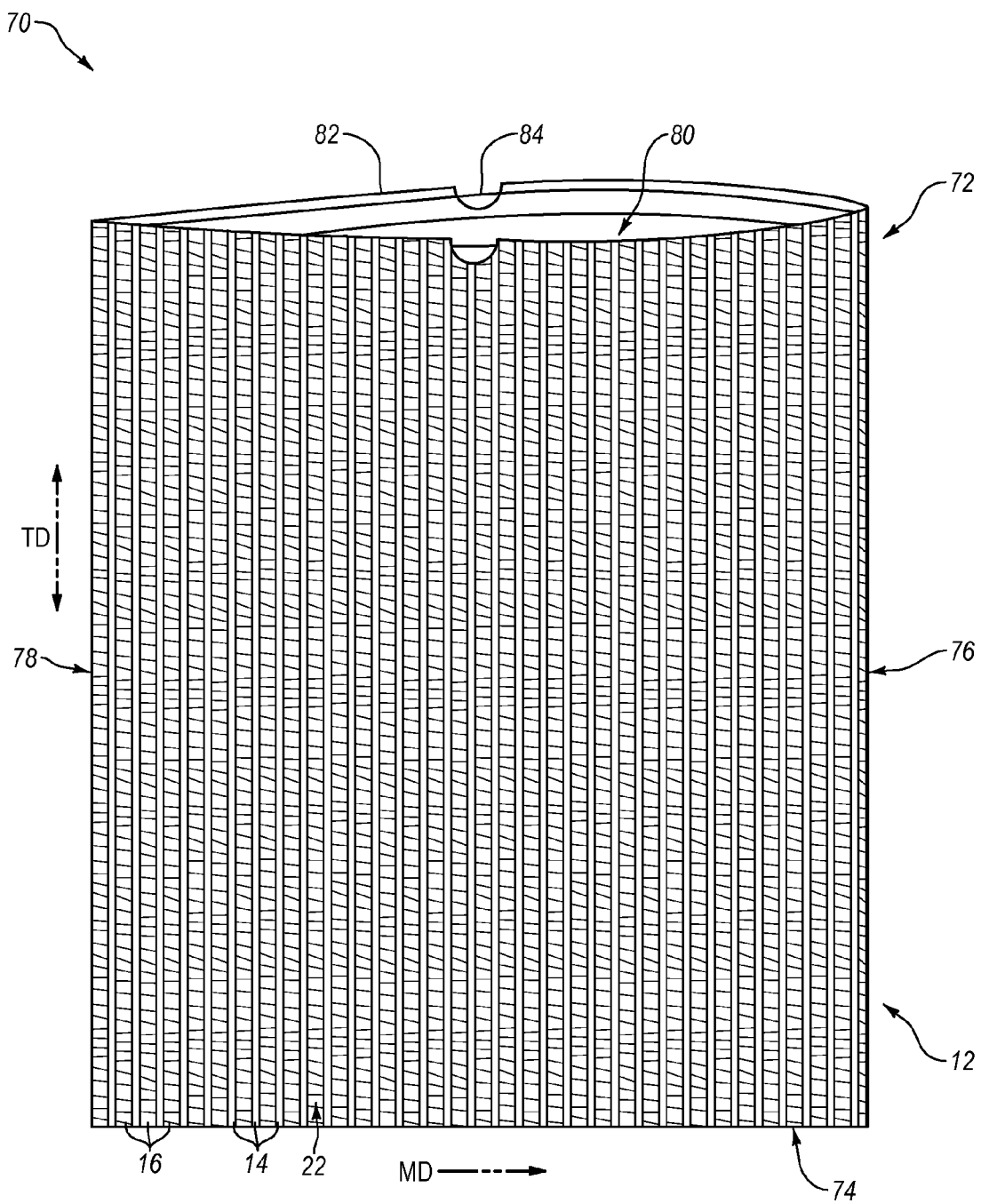
FIG. 6 illustrates a bag incorporating a machine-direction incrementally-stretched film with enhanced look and feel in accordance with one or more implementations of the present invention.

Referring to FIG. 6, in a particular implementation of the present invention, the MD incrementally-stretched film 10 illustrated in FIGS. 1A-1D may be incorporated in a bag construction, such as a flexible draw tape bag 70. The bag 70 can include a bag body 72 formed from a piece of MD incrementally-stretched film 10 folded upon itself along a bag bottom 74. Side seams 76 and 78 can bond the sides of the bag body 72 together to form a semi-enclosed container having an opening 80 along an upper edge 82. The bag 70 also optionally includes closure means 84 located adjacent to the upper edge 82 for sealing the top of the bag 70 to form a fully-enclosed container or vessel. The bag 70 is suitable for containing and protecting a wide variety of materials and/or objects. The closure means 84 can comprise flaps, adhesive tapes, a tuck and fold closure, an interlocking closure, a slider closure, a zipper closure or other closure structures known to those skilled in the art for closing a bag.

As shown, the one or more of the sides of the bag body 72 can include a ribbed pattern 12. The ribbed pattern 12 can include alternating series of thicker ribs and thinner ribs. The ribs can extend across the bag 70 in the TD direction, or in other words, from the bag bottom 74 to the upper edge 82. One or more of the sides of the bag body 72 can further include undulations or convolutions 22 (such as peaks and valleys) that provide the bag 70 with increased loft, perceived thickness, perceived strength, and/or enhanced look or feel. The bag 70 can require less material to form than an identical bag formed with an un-stretched film 10a of the same thermoplastic material. Additionally, despite requiring less material, the bag 70 can include the above-recited advantages.

Figure 7:
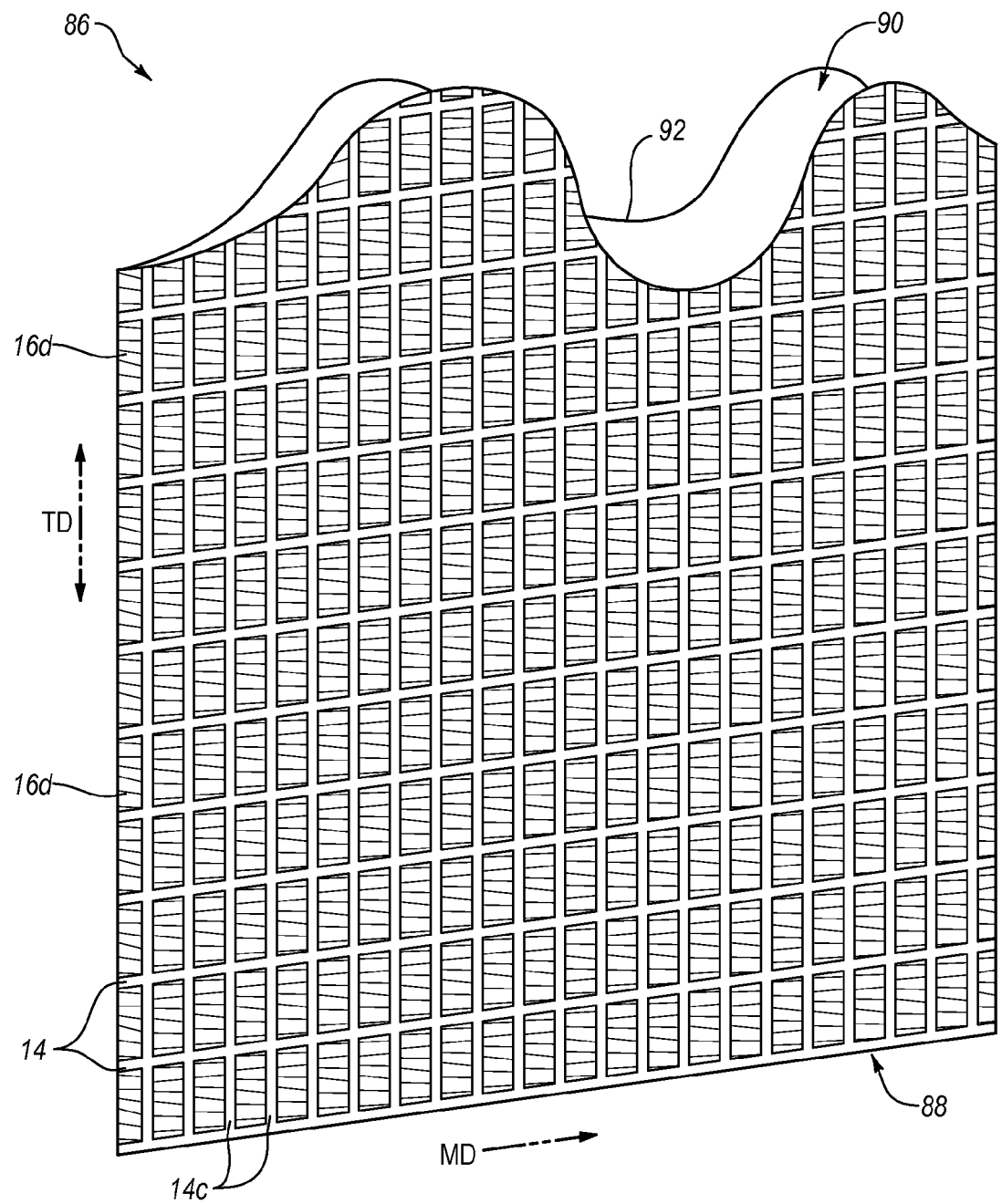
FIG. 7 illustrates another bag incorporating a machine-direction incrementally-stretched film with enhanced look and feel in accordance with one or more implementations of the present invention.

FIG. 7 illustrates a tie bag 86 incorporating an MD- and TD-incrementally-stretched film in accordance with an implementation of the present invention. As shown, the sides of the tie bag 86 can include a ribbed pattern. The ribbed pattern can include thicker ribs or un-stretched regions 14, 14c and thinner ribs 16d created by MD and TD ring rolling.

The ribbed pattern can include thicker ribs 14 that extend across the bag 106 in the machine direction. Additionally, the ribbed pattern can include thicker ribs 14c that extend across the bag 86 in the transverse direction, or in other words from the bag bottom 88 to flaps 90 of an upper edge 92 of the bag 86.

In comparison with the film 10c of FIG. 5, the spacing between the MD extending thicker ribs 14 is greater in the bag 86. This effect is created by using MD ring rolls having a greater pitch between ridges. The spacing of the TD extending thicker ribs 14c on the other hand is about the same as in film 10c. This effect is created by using TD ring rolls having the same pitch between ridges. Furthermore, the relative spacing between the MD extending stripes and the TD extending ribs differs in the bag 86, while relative spacing is the same in the film 10c. This effect is created by using TD ring rolls having a greater pitch between ridges compared to the pitch between ridges of the MD ring rolls. One will appreciate in light of the disclosure herein that the use of intermeshing rollers with greater or varied ridge pitch can provide the different spacing and thicknesses of the ribs. Thus, one will appreciate in light of the disclosure herein that a manufacturer can vary the ridge pitch of the intermeshing rollers to vary the pattern of the ribs, and thus, the aesthetic and/or properties of the bag or film.

FIG. 7 further illustrates that in at least on implementation, each thinner rib 16d can include a plurality of undulations or convolutions 22 (such as peaks and valleys). The undulations or convolutions 22 can provide the bag 86 with increased loft, perceived thickness, perceived strength, and/or enhanced look or feel. The bag 86 can require less material to form than an identical bag formed with an un-stretched film 10a of the same thermoplastic material.

Figure 8A:
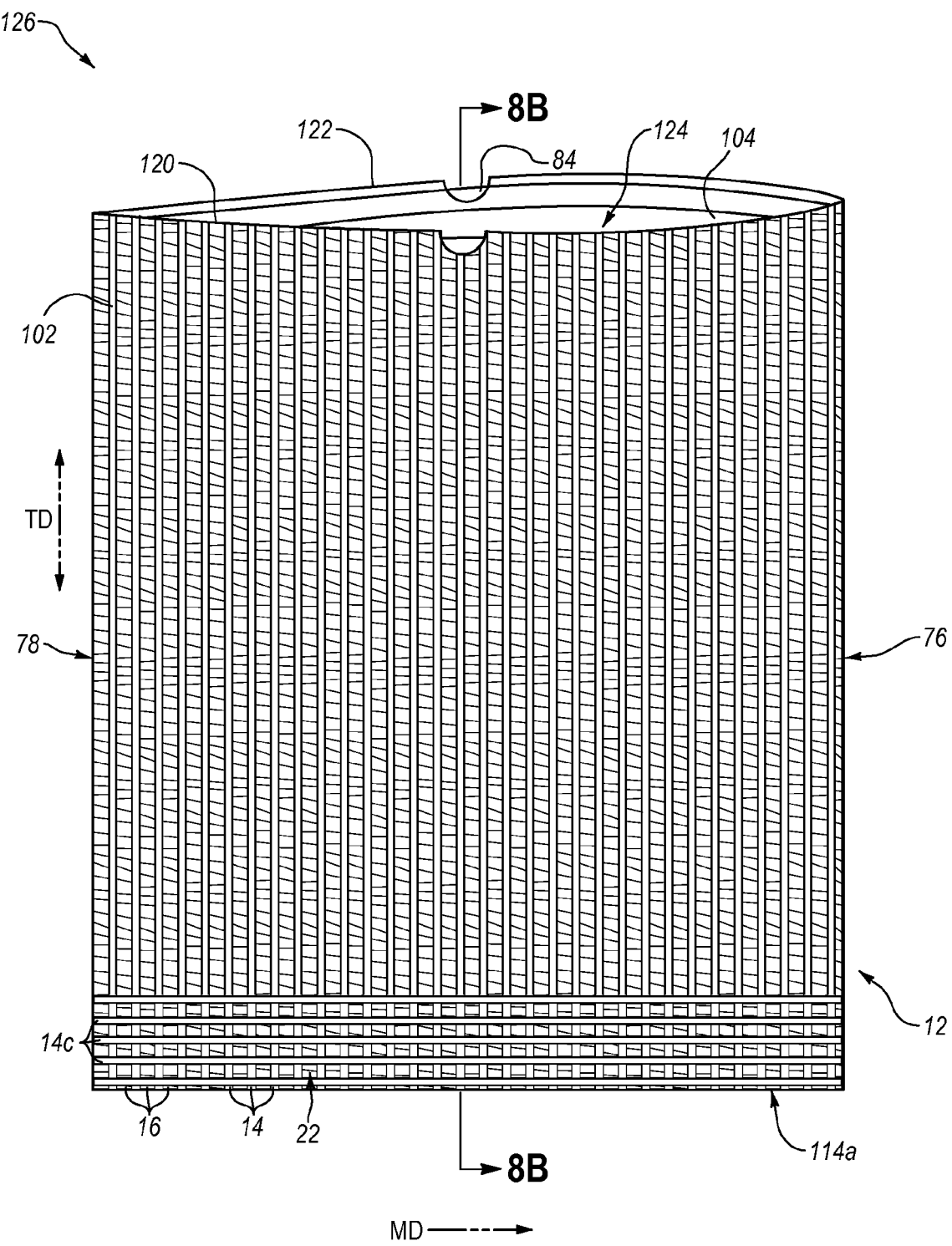
FIG. 8A illustrates yet another bag incorporating a machine-direction incrementally-stretched film with enhanced look and feel in accordance with one or more implementations of the present invention.
Figure 8B:
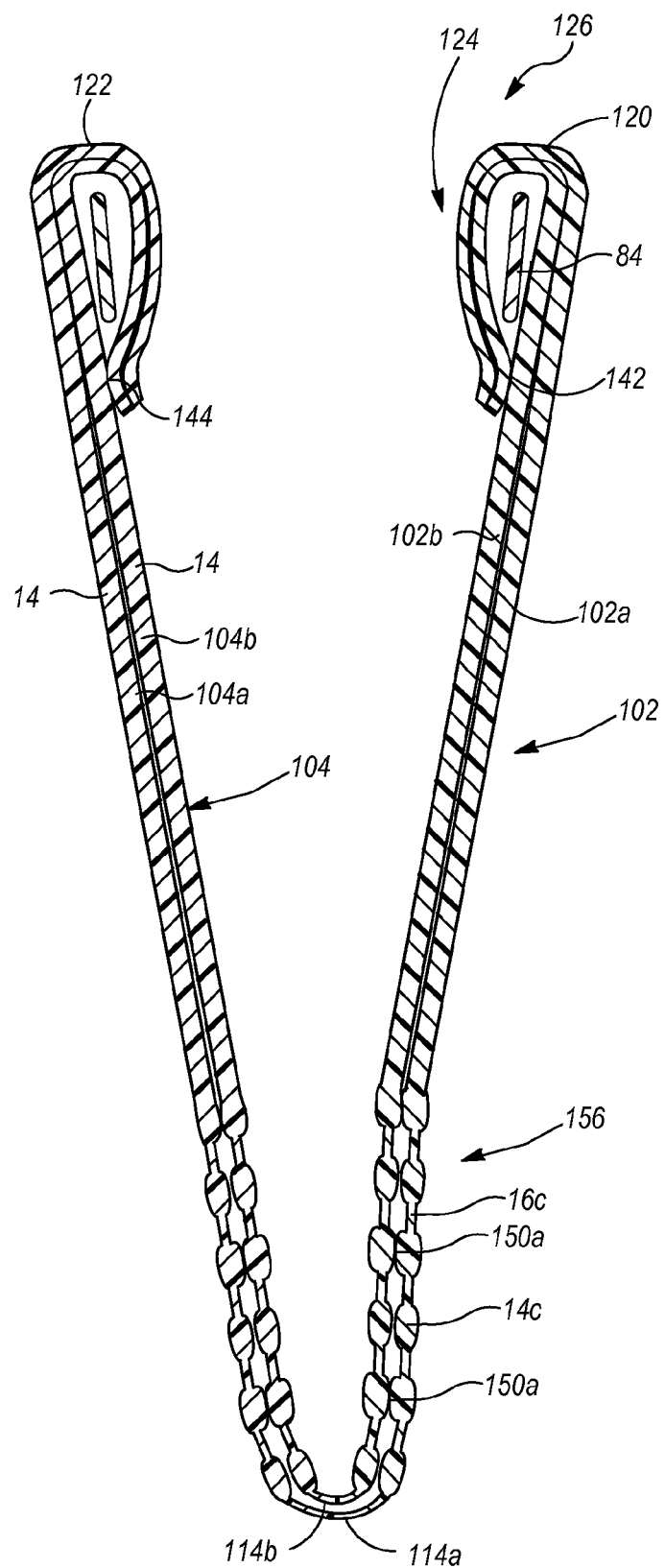
FIG. 8B illustrates a cross-sectional view of the bag of FIG. 8A taken along the line 8B-8B of FIG. 8A.

Each of the films and bags described herein above include a single film layer. One will appreciate in light of the disclosure herein that the present invention is not so limited. For example, FIGS. 8A and 8B illustrates a multi-layered thermoplastic bag 126 having sidewalls 102, 104 that each comprise a multi-layer thermoplastic material. The layers of such multi-layered thermoplastic materials may be joined by mechanical pressure, adhesives, heat, pressure, spread coating, extrusion coating, or combinations thereof. Thus, one will appreciate that one or more of the first sidewall 102 and the second sidewall 104 can comprise two, three, four, or more coextruded, continuously laminated, non-continuously laminated, or otherwise bonded layers.

Similar to bag 70, bag 126 can include side seams 76 and 78 can bond the side walls 102, 104 together to form a semi-enclosed container having an opening 124. The bag 126 also optionally includes closure means 84 for sealing the top of the bag 126 to form a fully-enclosed container or vessel. As shown, the one or more of the sides of the bag 126 can include a ribbed pattern 12. The ribbed pattern 12 can include alternating series of thicker ribs and thinner ribs. The ribs can extend across the bag 126 in the TD direction. One or more of the sidewalls 102, 104 can further include undulations or convolutions 22 (such as peaks 24 and valleys 26) that provide the bag 126 with increased loft, perceived thickness, perceived strength, and/or enhanced look or feel. The bag 126 can require less material to form than an identical bag formed with an un-stretched film 10a of the same thermoplastic material. Additionally, despite requiring less material, the bag 126 can include the above-recited advantages.

As shown by FIG. 8B, each sidewall 102, 104 can comprise a multi-layer thermoplastic material. In particular, the first sidewall 102 can comprise a first film layer 102a and a second film layer 102b. Similarly, the second sidewall 104 can comprise a first film layer 104a and a second film layer 104b. The second layer or bag 102b, 104b is positioned within the first layer or bag 102a, 104a. Such a configuration may be considered a "bag-in-bag" configuration. In other words the multi-layered thermoplastic bag 126 can include a second thermoplastic layer or bag formed from the second layers 102b, 104b positioned within a first thermoplastic layer or bag formed from the first layers 102a, 104a. Each of the first and second layers or bags can include a pair of opposing sidewalls joined together along three edges as described above in relation to the bag 70.

In particular, the first layers 102a, 104a and second layers 102b, 104b may be joined along a first side edge, an opposing second side edge, and a bottom edge. For example, FIG. 8B illustrates a first bottom edge 114a joining the first layers 102a, 104a, and a second bottom edge 114b joining the second layers 102b, 104b. The bottom edges 114a, 114b may extend between the first and second side edges of each of the first and second layers. In one or more implementations the thermoplastic sidewalls 102a and 104a, 102b and 104b are joined along the first and second side edges and along the bottom edges 114a, 114b by any suitable process, such as heat sealing. In alternative implementations, the bottom edge 114a, 114b, or one or more of the side edges can comprise a fold as shown in FIG. 8B.

At least a portion of the first and second top edges 120, 122 of the respective first and second sidewalls 102, 104 may remain un-joined to define an opening 124 located opposite the bottom edges 114, 114b. The opening 124 may be used to deposit items into the interior volume. Furthermore, the multi-layered thermoplastic bag 126 may be placed into a trash receptacle. When placed in a trash receptacle, the first and second top edges 120, 122 of the respective first and second sidewalls 102, 104 may be folded over the rim of the receptacle.

Additionally, as shown by FIG. 8B, the multi-layered thermoplastic bag 126 includes multiple layers. FIG. 8B illustrates a multi-layered thermoplastic bag 126 with two layers. One will appreciate in light of the disclosure herein that in alternative implementations one or more multi-layered bags of the present invention can include more than two layers. For example, multi-layered bags of one or more implementations can include 3, 4, 5, 6, or more layers.

In one or more implementations, the inner layer or bag 102b, 104b is joined or bonded to the outer layer or bag 102a, 104a of the multi-layered thermoplastic bag 126. For example, in one implementation the inner layer or bag 102b, 104b is joined to the outer layer or bag 102a, 104a only along the hems 142, 144. In alternative implementations, the inner layer or bag 102b, 104b can additionally, or alternatively, be joined to the outer layer or bag 102a, 104a along their respective edges. For example, one or more of the first side edges and the second side edges of the respective inner and outer layers or bags can be joined by a heat seal, a fold, or other mechanism. In at least one implementation the first side edges and the second side edges of the inner and outer layers or bags are joined by heat seals, while the bottom edges 114a, 114b comprise folds that are un-joined to each other.

In addition to the foregoing, in one or more implementations one or more of the sidewalls 102b, 104b of the inner layer or bag can be laminated to the respective sidewalls 102a, 104a of the outer layer or bag. For example, the sidewalls 102b, 104b of the inner layer or bag can be continuously bonded to the sidewalls 102a, 104a of the outer layer or bag. In particular, the inner and outer layers or bags can be co-extruded, joined shortly after extrusion while still tacky, adhesively bonded, or otherwise continuously bonded.

In alternative implementations, as shown in FIG. 8B, at least a portion of the inner layer or bag is non-continuously laminated to the outer layer or bag. For example, the inner layer or bag can be non-continuously laminated to the outer layer or bag using any of the methods, process, and techniques described in U.S. patent application Ser. No. 13/273,384 filed Oct. 14, 2011, the contents of which are hereby incorporated by reference in their entirety. For example, the inner layer or bag can be non-continuously laminated to the outer layer or bag using a process selected from the group consisting of adhesive bonding, ultrasonic bonding, thermal bonding, embossing, ring rolling, SELFing, and combinations thereof.

As explained in greater detail below, the multi-layered thermoplastic bag 126 can comprise two MD incrementally-stretched films (such as that shown by FIGS. 1A-1D) that are bonded together by passing together through a set of TD intermeshing rollers. In particular, FIG. 8B illustrates that a plurality of non-continuous bonds 150a securing the sidewalls 102b, 104b of the inner layer or bag to the sidewalls 102a, 104a of the outer layer or bag. In particular, the bonds 150a can comprise adhesive bonds, ultrasonic bonds, thermal bonds, or bonds formed from one or more of ring rolling, SELFing, or embossing. For example, FIG. 8B illustrates a plurality of partially discontinuous bonds 150a formed by TD ring rolling. Thus only a portion of the sidewalls 102b, 104b of the inner layer or bag are non-continuously laminated to the sidewalls 102a, 104a of the outer layer or bag in the multi-layered thermoplastic bag 126. In alternatively implementations, the entire sidewalls 102b, 104b of the inner layer or bag are continuously laminated to the sidewalls 102a, 104a of the outer layer or bag.

In particular, the simultaneous TD ring rolling of the inner and outer layers of the multi-layered thermoplastic bag 126 can create a TD ribbed pattern 156 in at least a portion of one or more of the inner layers 102b, 104b, the outer layers 102a, 104a. The TD ribbed pattern 156 can comprise a plurality of alternating thick linear ribs 14c and thin linear ribs 16c that may extend across one or more of the inner layers 102b, 104b and the outer layers 102a, 104a. As illustrated in FIG. 8B, the thick linear ribs 14c may be parallel and separated by thin ribs 16c including undulations or convolutions 22. Additionally, as illustrated in FIG. 8B, the TD ribbed pattern 156 may extend from the bottom edge 114a toward the opening 124.

FIG. 8B illustrates that the inner layer 102b, 104b of each sidewall 102, 104 can be bonded to the outer layer 102a, 104a, of each sidewall 102, 104. In particular, a plurality of non-continuous bonded regions or bonds 150a can secure the first and second layers 102a, 104a, 102b, 104b of the each sidewall together. Thus, the bonds 150a can comprise a pattern of linear bonds 150a extending between the first side edge and the second side edge of each sidewall 102, 104.

As shown by FIG. 8B, in one or more implementations, the bonds 150a can bond thick linear ribs 14c of the inner layer 102b, 104b of each sidewall 102, 104 to thick linear ribs 14c of the outer layer 102a, 104a of each sidewall 102, 104. FIG. 8B illustrates that the bonds 150a can secure some, but not all, of the thick linear ribs 14c of one layer to the thick linear ribs 14c of an adjacent layer. In particular, FIG. 8B illustrates that bonds 150a can secure every other thick linear rib 14c of adjacent layers together. In alternative implementations, bonds 150a can secure each thick linear rib 14c of adjacent layer together. Additionally, in one or more implementations the thin linear ribs 16 may be unbounded.

In one or more implementations, the non-continuous bonds 150a can have a bond strength that is less than a weakest tear resistance of each sidewalls 102a, 102b, 104a, 104b so as to cause the bonds 150a to fail prior to failing of the bag 126. Indeed, one or more implementations include bonds 150a that the release just prior to any localized tearing of the bag 126. In particular, the non-continuous bonds 150a between the inner and outer layers of the bag 100a can act to first absorb forces via breaking of the bonds 150a prior to allowing that same force to cause failure of the multi-layered bag 126. Such action can provide increased strength to the bag 100.

The multi-layered bag 126 includes non-continuous bonds only in a bottom portion (i.e., section adjacent the bottom edge). One will appreciate in alternative implementations the entire multi-layered bag 126 can be non-continuously laminated together. In still further implementations, one or more of an upper, a middle, and a bottom section of the respective layers of the multi-layered bag can be non-continuously laminated together.

Thus, one will appreciate in light of the disclosure herein that a manufacturer can tailor specific sections or zones of a bag or film with desirable properties by MD ring rolling, TD ring rolling, or a combination thereof. One region of the bag may include a first type of incremental stretching to increase the loft, strength parameters, and/or enhance the look and feel of the film or bag. Thus, a manufacturer can provide any region of a bag with the different incrementally-stretched films and their associated properties described herein above.

As alluded to earlier, in one or more implementations the lamination or bonding between layers of a multi-layer film may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction. Or alternatively, random bonded areas broken up by random un-bonded areas.

Implementations of the present invention can also include methods of incrementally stretching a film of thermoplastic material to produce increased loft and/or enhanced look or feel. The following describes at least one implementation of a method with reference to the components and diagrams of FIGS. 1A through 8B. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

Figure 9:
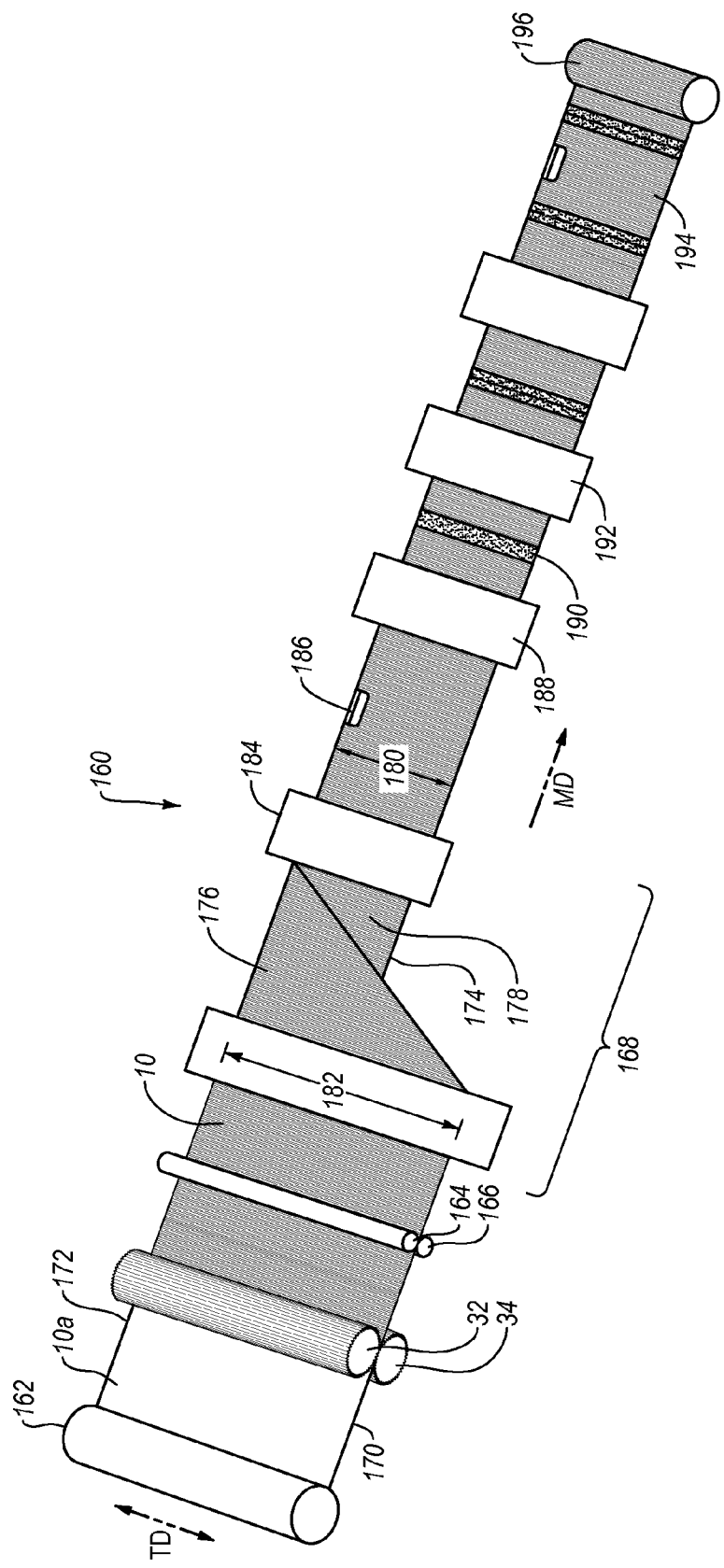
FIG. 9 illustrates a schematic diagram of a bag manufacturing process in accordance with one or more implementations of the present invention.

FIG. 9 illustrates an exemplary embodiment of a high-speed manufacturing process 160. The high-speed manufacturing process 160 can incrementally stretch a thermoplastic film in one or more of the machine direction and the transverse direction, while increasing the loft, reducing the gauge by weight, increasing the strength parameters, and/or enhancing the look and feel of the film or bag. According to the exemplary process, an un-stretched thermoplastic film 10a is unwound from a roll 162 and directed along a machine direction. The un-stretched film 10a can pass between one or more pairs of cylindrical intermeshing rollers to incrementally stretch the un-stretched film 10a and impart a ribbed pattern thereon. For example, FIG. 9 illustrates that the un-stretched film 10a can pass through a first pair of MD intermeshing rollers 32, 34. In alternative implementations, the un-stretched film 10a can pass through only MD intermeshing rollers, or through MD intermeshing rollers and TD intermeshing rollers or other rollers.

The rollers 32, 34 may be arranged so that their longitudinal axes are perpendicular to the machine direction. Additionally, the rollers 32, 34 may rotate about their longitudinal axes in opposite rotational directions. In various embodiments, motors may be provided that power rotation of the rollers 32, 34 in a controlled manner. As the un-stretched film passes between the rollers 32, 34 the ridges of the intermeshing rollers can impart a ribbed pattern and incrementally stretch the film, thereby creating an MD incrementally-stretched film 10.

During the manufacturing process 160, the incrementally-stretched film 10 can also pass through a pair of pinch rollers 164, 166. The pinch rollers 164, 166 can be appropriately arranged to grasp the incrementally-stretched film 10. The pinch rollers 164, 166 may facilitate and accommodate the incrementally-stretched film 10.

A folding operation 168 can fold the incrementally-stretched film 10 to produce the bottom of the finished bag. The folding operation 168 can fold the incrementally-stretched film 10 in half along the transverse direction. In particular, the folding operation 168 can move a first edge 170 adjacent to a second edge 172, thereby creating a folded edge 174. The folding operation 168 thereby provides a first film half 176 and an adjacent second web half 178. The overall width 180 of the second film half 178 can be half the second width 182 of the first film half 176 of the incrementally-stretched film 10.

To produce the finished bag, the processing equipment may further process the folded incrementally-stretched film 10. In particular, a draw tape operation 184 can insert a draw tape 186 into the incrementally-stretched film 10. Furthermore, a sealing operation 188 can form the parallel side edges of the finished bag by forming heat seals 190 between adjacent portions of the folded incrementally-stretched film 10. The heat seals 190 may be spaced apart along the folded incrementally-stretched film 10. The sealing operation 188 can form the heat seals 190 using a heating device, such as, a heated knife.

A perforating operation 192 may form a perforation in the heat seals 190 using a perforating device, such as, a perforating knife. The perforations in conjunction with the folded outer edge 174 can define individual bags 194 that may be separated from the incrementally-stretched film 10. A roll 196 can wind the incrementally-stretched film 10 embodying the finished bags 194 for packaging and distribution. For example, the roll 196 may be placed into a box or bag for sale to a customer.

In still further implementations, the folded incrementally-stretched film 10 may be cut into individual bags along the heat seals 190 by a cutting operation. In another implementation, the folded incrementally-stretched film 10 with may be folded one or more times prior to the cutting operation. In yet another implementation, the side sealing operation 188 may be combined with the cutting and/or perforation operations 192.

Figure 10:
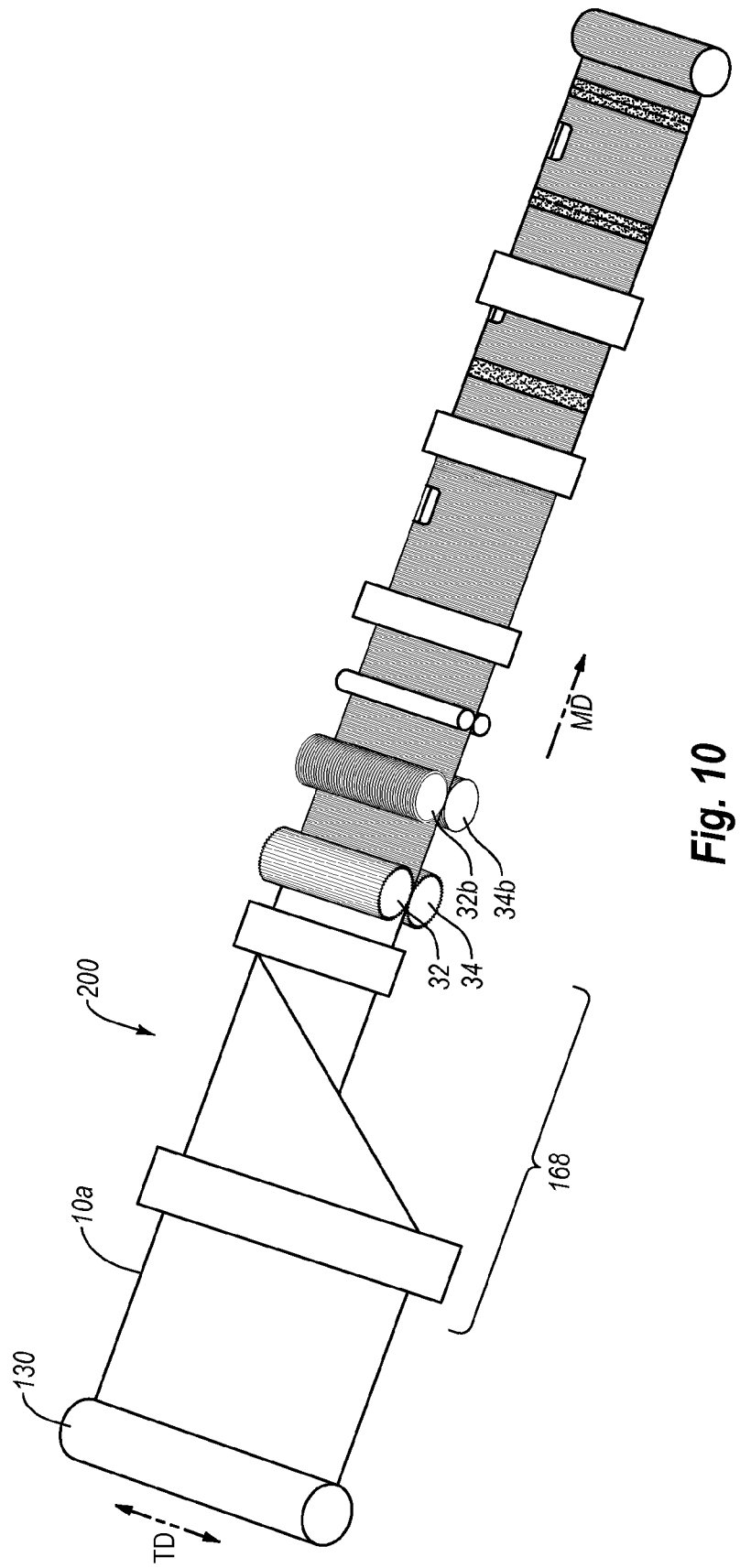
FIG. 10 illustrates a schematic diagram of another bag manufacturing process in accordance with one or more implementations of the present invention.

One will appreciate in light of the disclosure herein that the process 160 described in relation to FIG. 9 can be modified to omit or expanded acts, or vary the order of the various acts as desired. For example, FIG. 10 illustrates another manufacturing process 200 for producing a plastic bag having increased loft, reduced gauge by weight, increased strength parameters, and/or enhanced the look and feel. The process 200 can be similar to process 160 of FIG. 9, except that the un-stretched film 10a is incrementally after the folding operation 168 has folded the un-stretched film 10a in half. As shown by FIG. 10, both MD intermeshing rollers 32, 34 and TD intermeshing rollers 32b, 34b can incrementally stretch the film 10a to further increase the loft or pop of the undulations or convolutions 22 (such as peaks 24 and valleys 26), while simultaneously further decreasing the gauge by weight.

Figure 11:
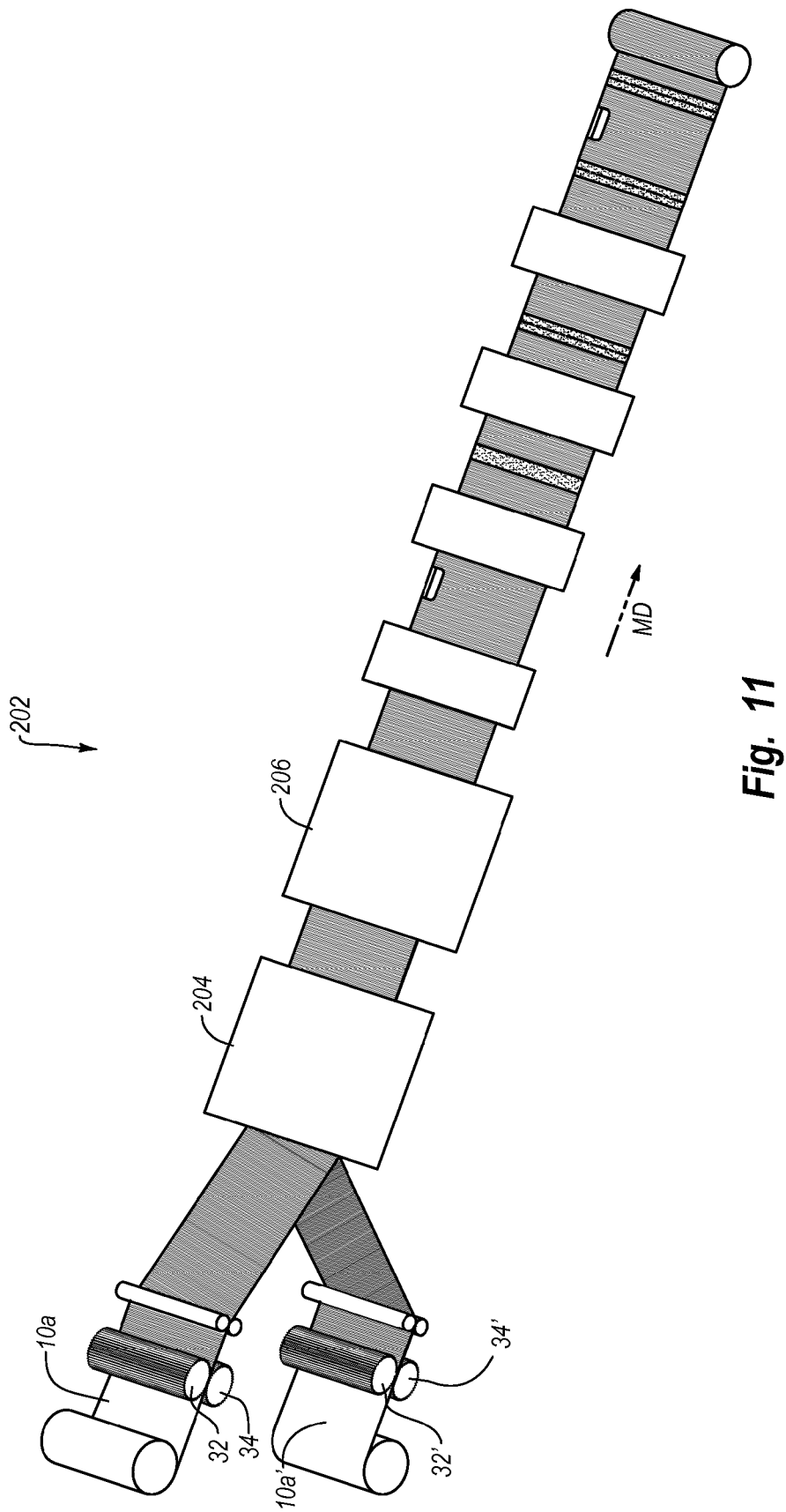
FIG. 11 illustrates a schematic diagram of yet another bag manufacturing process in accordance with one or more implementations of the present invention.

FIG. 11 illustrates yet another manufacturing process 202 for producing an incrementally-stretched plastic bag having increased loft, reduced gauge by weight, increased strength parameters, and/or enhanced the look and feel. The process 202 can be similar to process 160 of FIG. 9, except that multiple, folded film layer are used to form a multi-layered bag similar to the multi-layered bag 126 shown and described in relation to FIGS. 8A and 8B. In particular, the film layers 10a, 10a' are folded in half to form c-, u-, or j-folded films prior to winding on rolls. The folded films and webs may be formed by collapsing and then cutting an annular tube of film formed using a blown film process. In particular, the annular tube can be cut in half to form two folded films (which are mirror images of each other). In another processes, a folded film may be formed by the mechanical folding of a film. Thus, in such implementations, the films 10a, 10a' unwound from the rolls are already folded.

Additionally, the manufacturing process 202 illustrates that each film 10a, 10a' can pass through a set of intermeshing rollers 32, 34, 32', 34' to incrementally stretch the films, while increasing the loft, reducing the gauge by weight, increasing the strength parameters, and/or enhancing the look and feel of the film or bag. In alternative implementations, only one of the films 10a, 10a' are incrementally stretched. In still further implementation, neither of the films 10a, 10a' are incrementally stretched at this point and instead are incrementally stretched later during the lamination process.

In any event, the manufacturing process 202 can then include an insertion operation 204 for inserting the folded film 10a' into the folded film 10a, or vice versa. Insertion operation 202 can combine and laminate the folded films 10a, 10a' using any of the apparatus and methods described in U.S. patent application Ser. No. 13/225,757 filed Sep. 6, 2011 and Ser. No. 13/225,930 filed Sep. 6, 2011, each of which are incorporated herein by reference in their entirety.

Additionally, FIG. 11 illustrates that the film layers 10a, 10a' can then pass through a lamination operation 206 to lightly bond or laminate the films 10a, 10a' together. Lamination operation 206 can lightly laminate the folded films 10a, 10a' together via adhesive bonding, pressure bonding, ultrasonic bonding, corona lamination, and the like. Alternatively, lamination operation can lightly laminate the folded films 10a, 10a' together by passing them through machine-direction ring rolls, transverse-direction ring rolls, diagonal-direction ring rolls, SELF'ing rollers, embossing rollers, or other intermeshing rollers. Furthermore, the lamination operation 206 can laminate one or more sections of the film with a first plurality of non-continuous bonds and one or more additional sections with a second plurality of non-continuous bonds. The second plurality of non-continuous bonds can differ from the first plurality of non-continuous bonds. For example, the inner layer or bag can be non-continuously laminated to the outer layer or bag using any of the methods, process, and techniques described in U.S. patent application Ser. No. 13/273,384 filed Oct. 14, 2011, the contents of which were previously hereby incorporated by reference in their entirety.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A thermoplastic bag, comprising:
    first and second opposing sidewalls joined together along a first side edge, an opposite second side edge, and a bottom edge, the first and second sidewalls being unjoined along at least a portion of their respective top edges to define an opening;
    a plurality of thick and thin linear ribs in at least one of the first and second opposing sidewalls, the thick and thin linear ribs extending in the transverse direction;
    a plurality of peaks and valleys in at least one of the first and second sidewalls, the plurality of peaks and valleys extending generally in the transverse direction; and
    wherein a loft of the plurality of peaks and valleys is greater than a gauge of the thick linear ribs.

2. The thermoplastic bag as recited by claim 1, wherein the plurality of peaks and valleys are positioned in the thin linear ribs extending in the transverse direction.

3. The thermoplastic bag as recited by claim 2, wherein at least a portion of the first layer is non-continuously laminated to the second layer.

4. The thermoplastic bag as recited by claim 1, further comprising thick and thin linear ribs extending in the machine direction.

5. The thermoplastic bag as recited by claim 1, wherein a loft of the plurality of peaks and valleys is greater than a gauge of the thick linear ribs.

6. The thermoplastic bag as recited by claim 1, wherein each of the first and second opposing sidewalls comprise a first layer and at least a second layer.

7. The thermoplastic bag as recited by claim 1, wherein adjacent thick linear ribs are separated by thin linear ribs.

8. The thermoplastic bag as recited by claim 1, further comprising a plurality of intermediately thick linear ribs extending in the transverse direction across the at least one of the first and second opposing sidewalls, wherein the intermediately thick linear ribs have a thickness less than the thick linear ribs, but greater than the thin linear ribs.

9. The thermoplastic bag as recited by claim 8, wherein adjacent thick linear ribs are separated by a two thin linear ribs and an intermediately thick linear rib positioned therebetween.

* * * * *